(12) United States Patent
Uziel et al.

(10) Patent No.: US 12,706,726 B2
(45) Date of Patent: Aug. 11, 2026

(54) RATE MATCHING FOR CHANNEL AWARE TONE RESERVATION

(71) Applicant: QUALCOMM Incorporated, San Diego, CA (US)

(72) Inventors: Lior Uziel, Hod Hasharon (IL); Idan Michael Horn, Hod Hasharon (IL); Gideon Shlomo Kutz, Ramat Hasharon (IL); Konstantinos Dimou, New York, NY (US)

(73) Assignee: Qualcomm Incorporated, San Diego, CA (US)

( * ) Notice: Subject to any disclaimer, the term of this patent is extended or adjusted under 35 U.S.C. 154(b) by 396 days.

(21) Appl. No.: 18/446,423

(22) Filed: Aug. 8, 2023

(65) Prior Publication Data

US 2024/0063988 A1 Feb. 22, 2024

Related U.S. Application Data

(60) Provisional application No. 63/399,714, filed on Aug. 21, 2022.

(51) Int. Cl.
*H04L 5/00* (2006.01)
*H04W 72/232* (2023.01)

(52) U.S. Cl.
CPC .......... *H04L 5/0094* (2013.01); *H04L 5/0051* (2013.01); *H04W 72/232* (2023.01)

(58) Field of Classification Search
CPC ... H04L 5/0094; H04L 5/0048; H04L 5/0051; H04W 72/232
See application file for complete search history.

(56) References Cited

U.S. PATENT DOCUMENTS

2020/0280999 A1* 9/2020 Guo .................... H04W 72/542
2021/0280999 A1* 9/2021 Horii ...................... H01R 12/91
2021/0307016 A1* 9/2021 Takeda ............. H04W 72/0446
2021/0359890 A1 11/2021 Sahraei et al.
2022/0400042 A1 12/2022 Horn et al.
2023/0017408 A1* 1/2023 Levitsky ............... H04L 5/0048
(Continued)

FOREIGN PATENT DOCUMENTS

WO 2022198658 A1 9/2022

OTHER PUBLICATIONS

International Search Report and Written Opinion—PCT/US2023/029895—ISA/EPO—Nov. 21, 2023.
(Continued)

*Primary Examiner* — Andrew Lee
(74) *Attorney, Agent, or Firm* — Procopio, Cory, Hargreaves & Savitch LLP

(57) ABSTRACT

A first wireless device outputs, to a second wireless device, a first indication of a set of TR locations associated with a communication channel, where the set of TR locations are selected based on an estimate of an associated communication channel. The first indication of the set of TR locations includes at least one of a subcarrier bitmap, a granularity for the subcarrier bitmap, a subcarrier RIV, or a CSI-RS for TR. The network entity outputs a communication for the second wireless device, the communication including a first set of data tones and a second set of reserved tones, in a same symbol, based on the first indication of the set of TR locations.

30 Claims, 16 Drawing Sheets

(56) References Cited

U.S. PATENT DOCUMENTS

| | | | | |
|---|---|---|---|---|
| 2023/0129410 | A1* | 4/2023 | Hooli | H04L 1/08 370/329 |
| 2023/0327934 | A1* | 10/2023 | El Hamss | H04W 52/365 370/329 |
| 2024/0163049 | A1* | 5/2024 | Nagano | H04L 5/005 |
| 2024/0188988 | A1* | 6/2024 | Schneider | A61B 10/0096 |

OTHER PUBLICATIONS

Qualcomm Incorporated: "Network Energy Saving Techniques", 3GPP TSG RAN WG1 #110, R1-2207246, 3rd Generation Partnership Project (3GPP), Mobile Competence Centre, 650, Route Des Lucioles, F-06921 Sophia-Antipolis Cedex, France, vol. RAN WG1, No. Toulouse, France, Aug. 22, 2022-Aug. 26, 2022, 25 Pages, Aug. 13, 2022, XP052275182, Section 5.2.3, The Whole Document.

* cited by examiner

100
IP Services
176
IP Services
197
EPC
160
164
Other MMEs
168
MBMS GW
170
BM-SC
174
HSS
162
MME
166
Serving Gateway
172
PDN Gateway
196
UDM
Core Network
190
193
Other AMFs
192
AMF
194
SMF
195
UPF
106
CU
F1
F1
DU
DU
105
105
109
RU
132
132
184
184
Base Station/ RAN 102/180
132/184
120
120
104
104
104
104
158
158
120
102
132
104
134
134
110
182'
182
182''
UE
UE
104
104
158
TR Component
198/ 199
120
120
120
104
180
184
102 (102')
134
110 (110')
152
154
154
150
152
158
104
104
110
110
TR Component
198/ 199

1100

```
RateMatchPattern ::=                SEQUENCE {
    rateMatchPatternId                  RateMatchPatternId,

    patternType                         CHOICE {
        bitmaps                             SEQUENCE {
            resourceBlocks                      BIT STRING (SIZE (275)),
            symbolsInResourceBlock              CHOICE {
                oneSlot                             BIT STRING (SIZE (14)),
                twoSlots                            BIT STRING (SIZE (28))
            },
            periodicityAndPattern               CHOICE {
                n2                                  BIT STRING (SIZE (2)),
                n4                                  BIT STRING (SIZE (4)),
                n5                                  BIT STRING (SIZE (5)),
                n8                                  BIT STRING (SIZE (8)),
                n10                                 BIT STRING (SIZE (10)),
                n20                                 BIT STRING (SIZE (20)),
                n40                                 BIT STRING (SIZE (40))
            }
            ...
        },
        controlResourceSet                  ControlResourceSetId
    },
    subcarrierSpacing                   SubcarrierSpacing
    dummy                               ENUMERATED { dynamic, semiStatic },
```

1150

```
RateMatchPatternLTE-CRS ::=         SEQUENCE {
    carrierFreqDL                       INTEGER (0..16383),
    carrierBandwidthDL                  ENUMERATED {n6, n15, n25, n50, n75, n100, spare2, spare1},
    mbsfn-SubframeConfigList            EUTRA-MBSFN-SubframeConfigList
    nrofCRS-Ports                       ENUMERATED {n1, n2, n4},
    v-Shift                             ENUMERATED {n0, n1, n2, n3, n4, n5}
}
```

FIG. 11

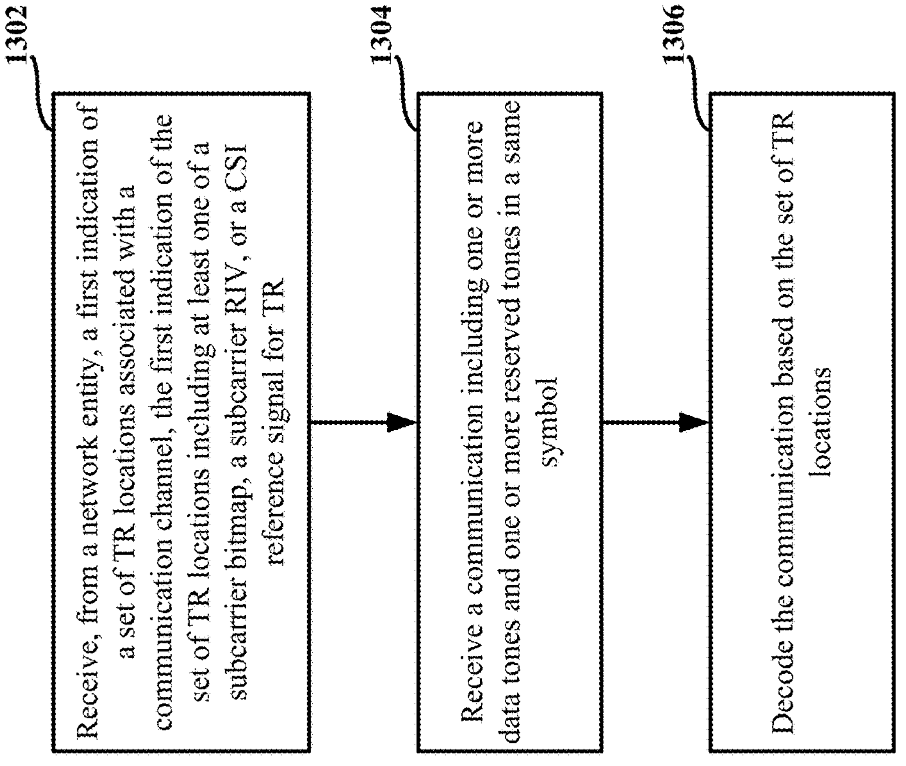
FIG. 13
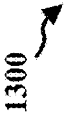

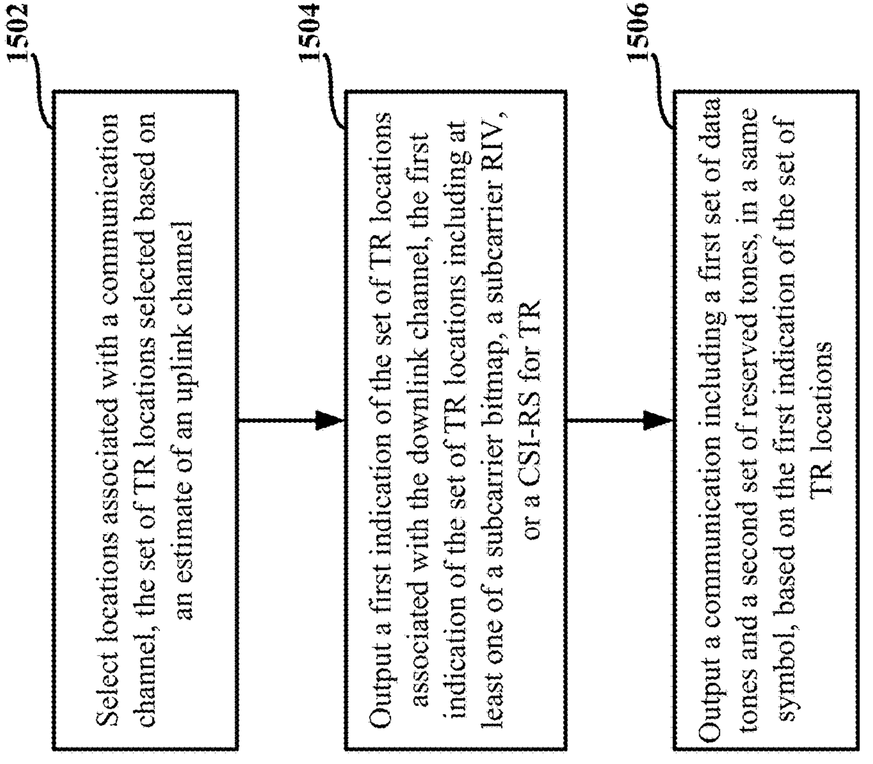
FIG. 15

RATE MATCHING FOR CHANNEL AWARE TONE RESERVATION

CROSS REFERENCE TO RELATED APPLICATION(S)

This application claims the benefit of and priority to U.S. Provisional Application Ser. No. 63/399,714, entitled "Techniques to Facilitate Rate Matching for Channel Aware Tone Reservation" and filed on Aug. 21, 2022, which is expressly incorporated by reference herein in its entirety.

TECHNICAL FIELD

The present disclosure relates generally to communication systems, and more particularly, to wireless communication employing peak-to-average power ration (PAPR) reduction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a network entity is provided. The method includes selecting a set of tone reservation (TR) locations associated with a downlink channel, the set of TR locations selected based on an estimate of an uplink channel; outputting, to a user equipment (UE), a first indication of the set of TR locations associated with the downlink channel, the first indication of the set of TR locations including at least one of a subcarrier bitmap, a subcarrier resource indicator value (RIV), or a channel state information (CSI) reference signal for TR; and outputting, to the UE, a communication including a first set of data tones and a second set of reserved tones, in a same symbol, based on the first indication of the set of TR locations.

In an aspect of the disclosure, a computer-readable storage medium storing computer executable code for wireless communication at a network entity is provided. The code when executed by a processor causes the processor to select a set of TR locations associated with a downlink channel, the set of TR locations selected based on an estimate of an uplink channel; output, to a UE, a first indication of the set of TR locations associated with the downlink channel, the first indication of the set of TR locations including at least one of a subcarrier bitmap, a subcarrier RIV, or a CSI-RS for TR; and output, to the UE, a communication including a first set of data tones and a second set of reserved tones, in a same symbol, based on the first indication of the set of TR locations.

In an aspect of the disclosure, an apparatus for wireless communication at a network entity is provided. The apparatus includes means for selecting a set of TR locations associated with a downlink channel, the set of TR locations selected based on an estimate of an uplink channel; means for outputting, to a UE, a first indication of the set of TR locations associated with the downlink channel, the first indication of the set of TR locations including at least one of a subcarrier bitmap, a subcarrier RIV, or a CSI-RS for TR; and means for outputting, to the UE, a communication including a first set of data tones and a second set of reserved tones, in a same symbol, based on the first indication of the set of TR locations.

In an aspect of the disclosure, an apparatus for wireless communication at a network entity is provided. The apparatus includes memory and at least one processor coupled to the memory and configured to select a set of TR locations associated with a downlink channel, the set of TR locations selected based on an estimate of an uplink channel; output, to a UE, a first indication of the set of TR locations associated with the downlink channel, the first indication of the set of TR locations including at least one of a subcarrier bitmap, a subcarrier RIV, or a CSI-RS for TR; and output, to the UE, a communication including a first set of data tones and a second set of reserved tones, in a same symbol, based on the first indication of the set of TR locations.

In an aspect of the disclosure, a method of wireless communication at a UE is provided. The method includes receiving, from a network entity, a first indication of a set of TR locations associated with a downlink channel, the first indication of the set of TR locations including at least one of a subcarrier bitmap, a subcarrier RIV, or a CSI-RS for TR; receiving a communication including one or more data tones and one or more reserved tones in a same symbol; and decoding the communication based on the set of TR locations.

In an aspect of the disclosure, a computer-readable storage medium storing computer executable code for wireless communication at a UE is provided. The code when executed by a processor causes the processor to receive, from a network entity, a first indication of a set of TR locations associated with a downlink channel, the first indication of the set of TR locations including at least one of a subcarrier bitmap, a subcarrier RIV, or a CSI-RS for TR; receive a communication including one or more data tones and one or more reserved tones in a same symbol; and decode the communication based on the set of TR locations.

In an aspect of the disclosure, an apparatus for wireless communication at a UE is provided. The apparatus includes means for receiving, from a network entity, a first indication of a set of TR locations associated with a downlink channel, the first indication of the set of TR locations including at least one of a subcarrier bitmap, a subcarrier RIV, or a CSI-RS for TR; means for receiving a communication including one or more data tones and one or more reserved tones in a same symbol; and means for decoding the communication based on the set of TR locations In an aspect of the disclosure, an apparatus for wireless communication at a UE is provided. The apparatus includes memory and at least one processor coupled to the memory and configured to receive, from a network entity, a first indication of a set of TR locations associated with a downlink channel, the first indication of the set of TR locations including at least one of a subcarrier bitmap, a subcarrier RIV, or a CSI-RS for TR; receive a communication including one or more data tones and one or more reserved tones in a same symbol; and decode the communication based on the set of TR locations.

In an aspect of the disclosure, a method, apparatus and computer-readable medium are provided for wireless communication at a first wireless device. The apparatus outputs, to a second wireless device, a first indication of the set of TR locations associated with a communication channel. The set of TR locations are selected based on an estimate of an associated communication channel. The first indication of the set of TR locations includes at least one of a subcarrier bitmap, granularity for the subcarrier bitmap, a subcarrier RIV, or a CSI reference signal for TR. The apparatus output a communication for the second wireless device, the communication including a first set of data tones and a second set of reserved tones, in a same symbol, based on the first indication of the set of TR locations.

In an aspect of the disclosure, a method, apparatus and computer-readable medium are provided for wireless communication at a second wireless device. The apparatus receives, from the first wireless device, a first indication of a set of TR locations associated with a communication channel. The first indication of the set of TR locations includes at least one of a subcarrier bitmap, a granularity for the subcarrier bitmap, a subcarrier RIV, or a CSI reference signal for TR. The apparatus receives a communication including one or more data tones and one or more reserved tones in a same symbol and decodes the communication based on the set of TR locations.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 depicts pseudocode for facilitating an example of PRB-symbol rate matching patterns, in accordance with various aspects of the present disclosure.

FIG. 13 is a flowchart of a method of wireless communication at a UE, in accordance with aspects presented herein.

FIG. 15 is a flowchart of a method of wireless communication at a network entity, in accordance with aspects presented herein.

DETAILED DESCRIPTION

Figure 1:
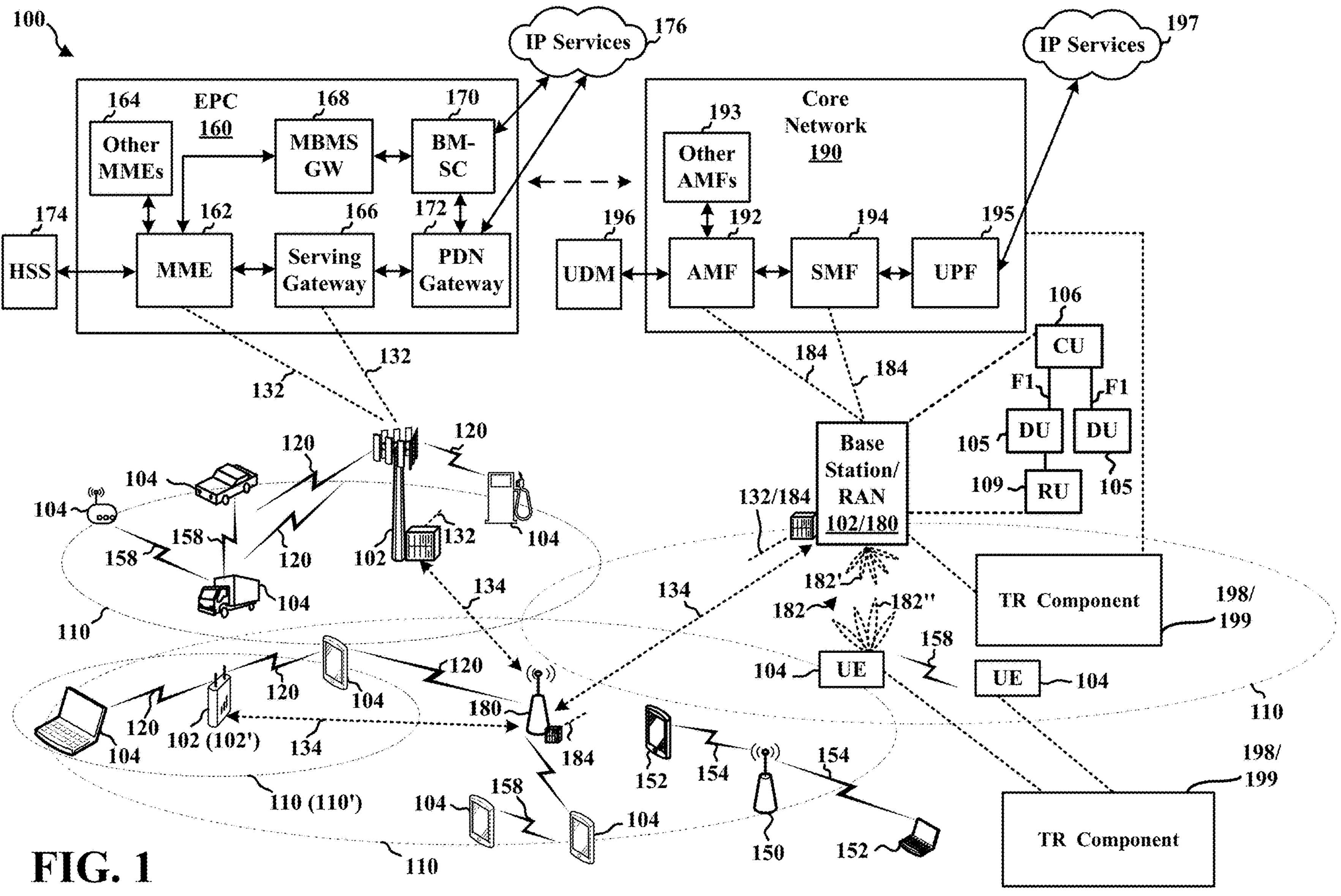
FIG. 1 is a diagram illustrating an example of a wireless communications system and an access network.

Aspects disclosed herein provide techniques for indicating tone reservation (TR) locations to improve efficiency of PAPR. Tone reservation is a technique for reducing PAPR at a transmitting device, such as a network entity. For example, when employing tone reservation, a transmitting device may replace certain data tones of a transmission with reserved tones. The insertion of the reserved tones may cause some data to be lost, but may also reduce the amount of power associated with the transmission.

In some aspects, a transmitting device may indicate the location of the reserved tones using existing signaling between the transmitting device and a receiving device. For example, the transmitting device may use a zero power (ZP) CSI-RS (ZP-CSI-RS) to indicate the locations of reserved tones in a communication. In some examples, the transmitting device may indicate the location of the reserved tones configured not to allocate reserved tones on PRBs containing certain subcarriers. In some examples, the transmitting device may indicate the location of the reserved tones via a PRB-symbol bitmap rate matching pattern.

A receiving device may use the indication of the locations of the reserved tones to facilitate decoding a communication received from the transmitting device. For example, the receiving device may determine the locations of the reserved tones and then perform rate matching around the determined locations. The use of the reserved tones presented herein enables a reduction in PAPR and can help to provide power savings. Wireless communication performance can be improved through the selection of tones based on channel conditions. As the tones may change due to changing channel conditions, the present disclosure provides aspects to enable a receiver to identify and rate match around the selected tones. Although some examples are described for a base station as a transmitter and a UE as a receiver, the aspects may be similarly applied for reserved tones in uplink communication or sidelink communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network (NW), a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g. a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas. For example, the small cell 102' may have a coverage area 110' that overlaps the respective geographic coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication links, such as a D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi access point (AP), such as an AP 150, in communication with Wi-Fi stations (STAs), such as STAs 152, via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB, may operate in a traditional sub 6 GHz spectrum, in millimeter wave frequencies, and/or near millimeter wave frequencies in communication with the UE 104. When the gNB operates in millimeter wave or near millimeter wave frequencies, the base station 180 may be referred to as a millimeter wave base station. A millimeter wave base station may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (e.g., an MME 162), other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a second wireless device such as the UE 104 may include a TR component 198 configured to receive, from a network entity, a first indication of a set of TR locations associated with a communication channel. The set of TR locations may be selected based on a estimation of an associated channel. The first indication of the set of TR locations may include at least one of a subcarrier bitmap, a granularity for the subcarrier bitmap, a subcarrier RIV, or a CSI-RS for TR. The TR component 199 may be configured to receive a communication including one or more data tones and one or more reserved tones in a same symbol; and decode the communication based on the set of TR locations. In certain aspects a first wireless device such as the base station 180, or a component of a base station, may include a TR component 199 configured to select a set of TR locations associated with a communication channel, the set of TR locations selected based on an estimate of an associated communication channel. The TR component 199 may be configured to output, to the second wireless device, a first indication of the set of TR locations associated with the communication channel, the first indication of the set of TR locations including at least one of a subcarrier bitmap, a granularity for the subcarrier bitmap, a subcarrier RIV, or a CSI-RS for TR; and output, to the second wireless device, a communication including a first set of data tones and a second set of reserved tones, in a same symbol, based on the first indication of the set of TR locations. Although examples aspects may be described for communication from a base station to a UE to illustrate the concept, the aspects may also be applied for tone reservation for uplink communication and/or sidelink communication. For example, a UE may include a TR component 198 and/or a TR component 199. Similarly, a base station or one or more components of a base station, such as a CU, DU and/or DU, may include a TR component 199 and/or a TR component 198.

Although the following description may be focused on 5G NR, the concepts described herein may be applicable to other similar areas, such as LTE, LTE-A, CDMA, GSM, 6G, and other wireless technologies.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
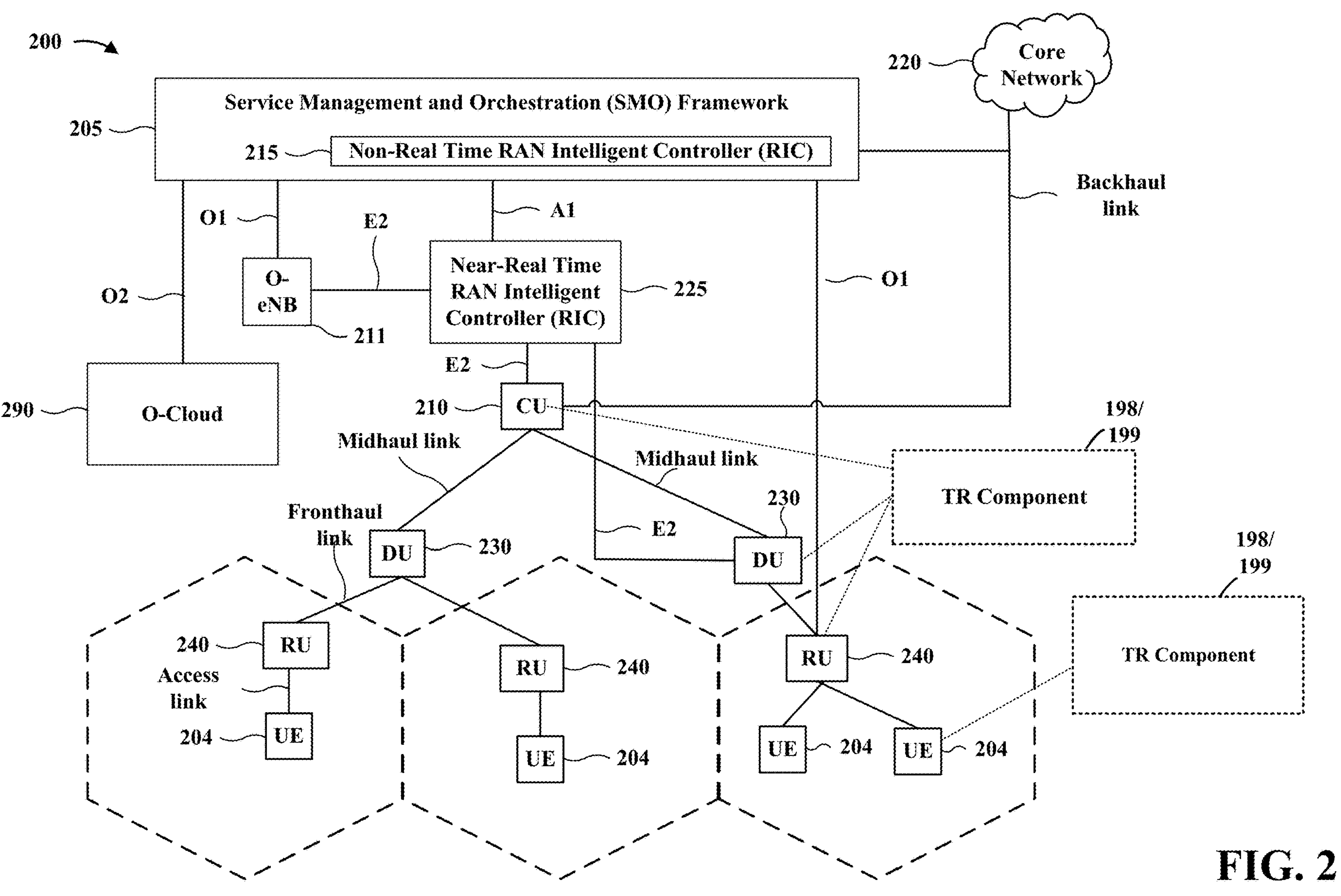
FIG. 2 shows a diagram illustrating an example disaggregated base station architecture.

FIG. 2 shows a diagram illustrating an example disaggregated base station 200 architecture. The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) (e.g., a Near-RT RIC 225) via an E2 link, or a Non-Real Time (Non-RT) RIC (e.g., a Non-RT RIC 215) associated with a Service Management and Orchestration (SMO) Framework (e.g., an SMO Framework 205), or both). A CU of the one or more CUs 210 may communicate with one or more DUs 230 via respective midhaul links, such as an F1 interface. The one or more DUs 230 may communicate with one or more RUs 240 via respective fronthaul links. The one or more RUs 240 may communicate with respective UEs via one or more radio frequency (RF) access links. In some implementations, a UE may be simultaneously served by multiple RUs.

Each of the units, i.e., the one or more CUs 210, the one or more DUs 230, the one or more RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the one or more CUs 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the one or more CUs 210. The CU may be configured to handle user plane functionality (i.e., Central Unit—User Plane (CU-UP)), control plane functionality (i.e., Central Unit—Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The one or more DUs 230 may correspond to a logical unit that includes one or more base station functions to control the operation of one or more RUs 240. In some aspects, the one or more DUs 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the one or more DUs 230 may further host one or more low PHY layers. Each layer (or module) can be implemented with an interface configured to communicate signals with other layers (and modules) hosted by the one or more DUs 230, or with the control functions hosted by the one or more CUs 210.

Lower-layer functionality can be implemented by one or more RUs 240. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the one or more RUs 240 can be implemented to handle over the air (OTA) communication with one or more UEs 204. In some implementations, real-time and non-real-time aspects of control and user plane communication with the RU(s) can be controlled by the corresponding DU. In some scenarios, this configuration can enable the one or more DUs 230 and the one or more CUs 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, one or more CUs 210, one or more DUs 230, one or more RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

As described in connection with FIG. 1, a second wireless device, which may correspond to the UE 204 or a network component such as a CU 210, DU 230, and/or RU 240, may include a TR component 198 configured to receive, from a network entity, a first indication of a set of TR locations associated with a communication channel, the first indication of the set of TR locations including at least one of a subcarrier bitmap, a subcarrier RIV, or a CSI-RS for TR; receive a communication including one or more data tones and one or more reserved tones in a same symbol; and decode the communication based on the set of TR locations. In some aspects, a first wireless device, such as a base station 180, a component of a base station, or a UE, may include a TR component 199 configured to select a set of TR locations associated with a communication channel, the set of TR locations selected based on an estimate of an associated channel; output a first indication, for a second wireless device, of the set of TR locations associated with the downlink channel, the first indication of the set of TR locations including at least one of a subcarrier bitmap, a subcarrier RIV, or a CSI-RS for TR; and output a communication for a second wireless device including a first set of data tones and a second set of reserved tones, in a same symbol, based on the first indication of the set of TR locations.

Figures 3A, 3B, 3C, 3D:
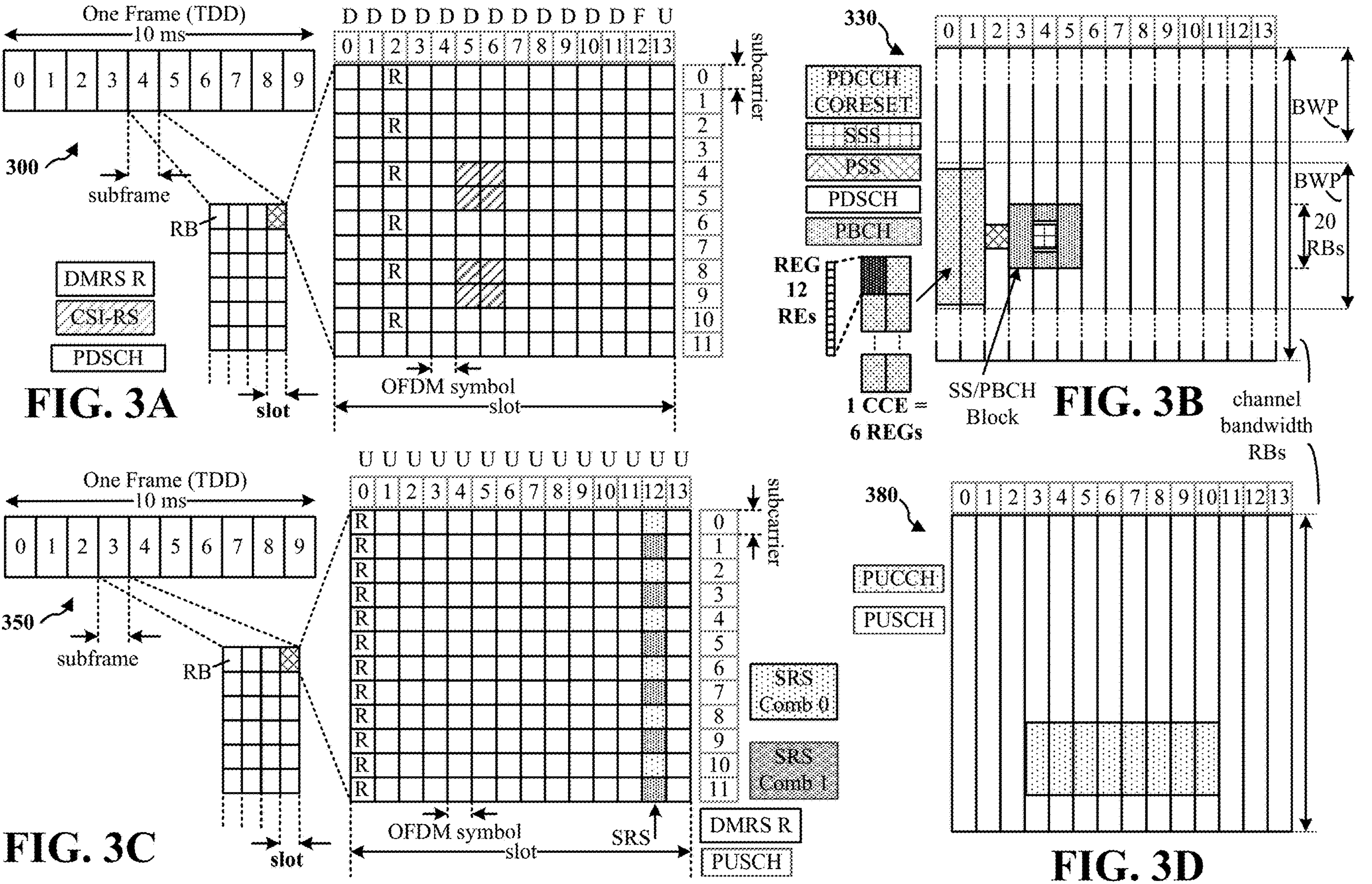
FIG. 3A is a diagram illustrating an example of a first frame, in accordance with various aspects of the present disclosure.
FIG. 3B is a diagram illustrating an example of downlink (DL) channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink (UL) channels within a subframe, in accordance with various aspects of the present disclosure.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. As shown in Table 1, the subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of normal CP with 14 symbols per slot and numerology μ=2 with 4 slots per subframe. The slot duration is 0.25 μs, the subcarrier spacing is 60 kHz, and the symbol duration is approximately 16.67 μs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible), e.g., PDSCH DM-RS, and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages. The PDSCH may include DM-RS, e.g., as described in connection with the example in FIG. 3A.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
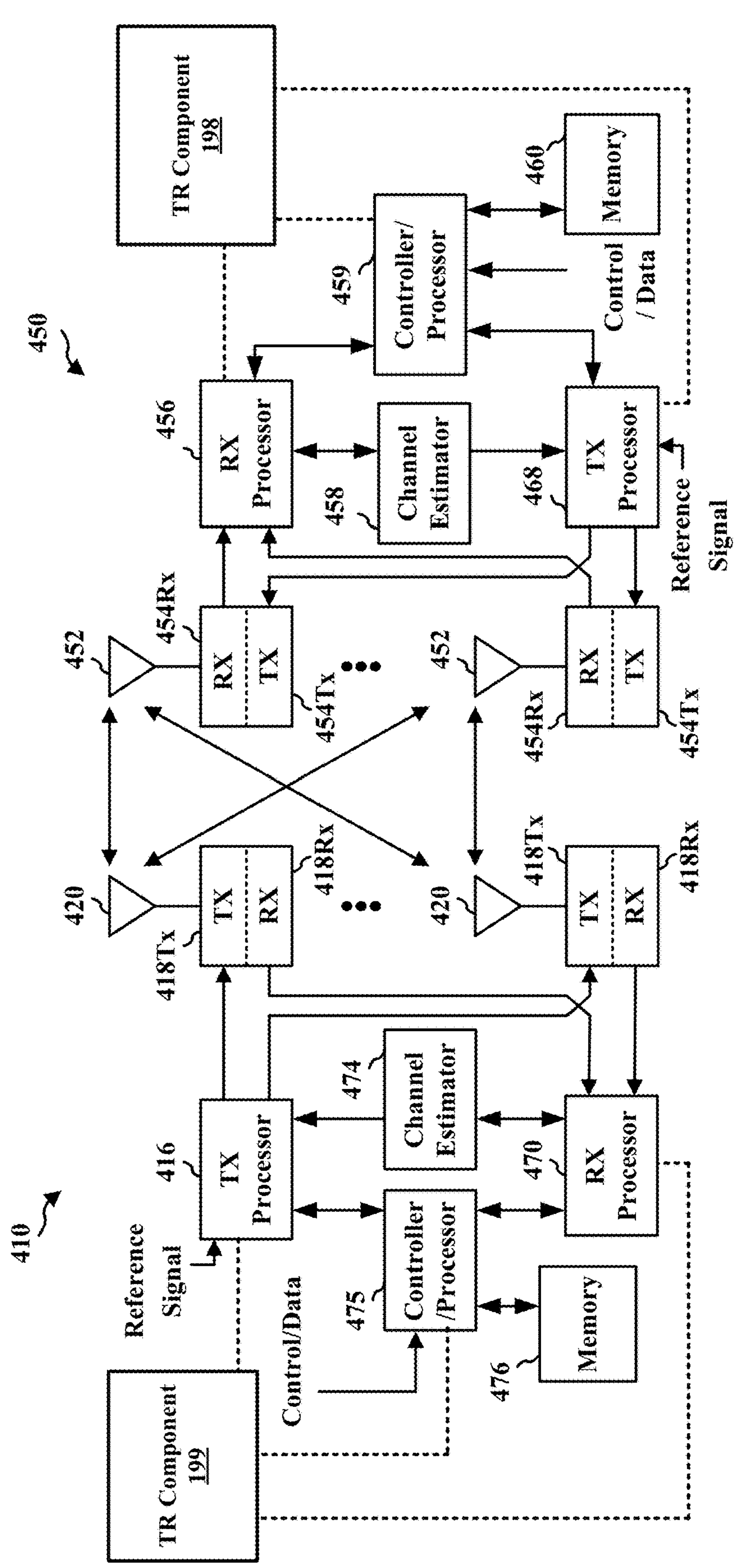
FIG. 4 is a diagram illustrating an example of a base station and user equipment (UE) in an access network.

FIG. 4 is a block diagram that illustrates an example of a first wireless device that is configured to exchange wireless communication with a second wireless device. In the illustrated example of FIG. 4, the first wireless device may include a base station 410, the second wireless device may include a UE 450, and the base station 410 may be in communication with the UE 450 in an access network. As shown in FIG. 4, the base station 410 includes a transmit processor (TX processor 416), a transmitter 418Tx, a receiver 418Rx, antennas 420, a receive processor (RX processor 470), a channel estimator 474, a controller/processor 475, and memory 476. The example UE 450 includes antennas 452, a transmitter 454Tx, a receiver 454Rx, an RX processor 456, a channel estimator 458, a controller/processor 459, memory 460, and a TX processor 468. In other examples, the base station 410 and/or the UE 450 may include additional or alternative components.

In the DL, Internet protocol (IP) packets may be provided to the controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC)

layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 416 and the RX processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna of the antennas 420 via a separate transmitter (e.g., the transmitter 418Tx). Each transmitter 418Tx may modulate a radio frequency (RF) carrier with a respective spatial stream for transmission.

At the UE 450, each receiver 454Rx receives a signal through its respective antenna of the antennas 452. Each receiver 454Rx recovers information modulated onto an RF carrier and provides the information to the RX processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, two or more of the multiple spatial streams may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with the memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna of the antennas 452 via separate transmitters (e.g., the transmitter 454Tx). Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna of the antennas 420. Each receiver 418Rx recovers information modulated onto an RF carrier and provides the information to the RX processor 470.

The controller/processor 475 can be associated with the memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 468, the RX processor 456, and the controller/processor 459 may be configured to perform aspects in connection with the TR component 198 or 199 of FIG. 1 and/or FIG. 2.

At least one of the TX processor 416, the RX processor 470, and the controller/processor 475 may be configured to perform aspects in connection with the TR component 198 or 199 of FIG. 1 and/or FIG. 2.

A power amplifier is a device that may be used to increase the magnitude (e.g., voltage, current, power, etc.) of an input signal. A power amplifier may take an input signal or waveform, apply power to the input signal, and output an output signal that is similar to but with a stronger waveform than the input signal. The design and implementation of power amplifiers in wireless communications may help signals transmitted by transmitting devices to be strong enough to reach (e.g., to be received by) receiving devices.

As a power amplifier may consume extra power to magnify an input signal, a goal in designing a power amplifier is to have a linear relationship between an input signal and an output signal. For a power amplifier with linear behavior, the power of an output signal may be directly proportional to the power of an input signal. For example, if 10 milliwatts (mW) of input signal power corresponds to 15 mW of output signal power, then 20 mW of input signal power may correspond to 30 mW of output signal power, etc.

However, power amplifiers may approximately follow the linear behavior for a limited range of input signals and may have non-linear behavior outside the range of the input signals. As the output signal power of the power amplifier may not increase indefinitely due to physical constrains, at some points (e.g., at a saturation point), an increase in input signal power for the power amplifier may not produce a discernible increase in the output signal power. Thus, the power amplifier may start to follow non-linear behavior. Additionally, the non-linear behavior may become particularly noticeable when the power amplifier is operating at higher input signal powers. For example, when a power amplifier is saturated (e.g., passing the saturation point), the output signal power may no longer be proportional to the input signal power, where a large increase in an input signal power beyond the saturation input signal power point may yield a relatively small increase in an output signal power from the saturation output signal power point. As the power amplifier may consume a significant fraction of the power in a communication device, operating the power amplifier beyond the saturation point may waste additional power, and may be an inefficient use of the power amplifier. In addition, the non-linear behavior of the power amplifier may also result in in-band and out-of-band distortion of the signal, and may degrade error vector magnitude (EVM) at a receiving device when the input signal power and the output power are not proportional.

To avoid operating a power amplifier beyond the saturation point (e.g., to avoid the drawbacks associated with non-linearity at high input power), the power amplifier may be configured to operate at a mean input power that is several decibels (dB) lower than the saturation point, such that the input signal power may not exceed the saturation input signal power point. For example, for an input signal waveform with a high peak to average power ratio (PAPR), the input signal waveform may be transmitted in a linear region of the power amplifier by decreasing the average power of the input signal. This may be referred to as an "input backoff" (IBO), which may result in a proportional "output backoff" (OBO). A power amplifier may operate most efficiently when the IBO is close or equal to the PAPR of the input signal. For example, if an input signal has a PAPR of X dB, then an IBO of X dB may be applied to the power amplifier to avoid non-linearity behavior. This enables the input signal to be amplified within the linear region when the input signal waveform of the input signal is at the peak. Such techniques may the output signal waveform from distortion during an amplification, which may happen when the input signal waveform or part of the input signal waveform is amplified at the non-linear region.

However, if a high IBO is applied to a power amplifier, but the input signal does not have a high PAPR (e.g., IBO>>PAPR), it may be an inefficient use of the power amplifier as it may reduce the maximum amplification of the power amplifier. For example, a portion of the linear region within the power amplifier may be unused due to the high IBO, particularly the region close to the saturation points where a high input signal may be amplified to nearly proportionate high output signal. This may limit the maximum performance of the power amplifier and reduce a transmission range of a transmitting device. However, if the IBO applied to a power amplifier is too low and the input signal has a PAPR that exceeds the IBO (e.g., PAPR>>IBO), at least a portion of the input signal may be amplified at the non-linear region of the power amplifier, which may cause the output signal to be distorted and the bit error rate (BER) performance of a transmitting device may be degraded.

While OFDM signals may have tolerance to inter-symbol interference and good spectral efficiency, due to large fluctuations in their signal envelopes, OFDM signals may suffer from significant PAPR that may grow rapidly with the size of an OFDM block. For example, for a network that employs larger OFDM blocks, such as may be employed in 5G NR and beyond, the OFDM blocks may have higher PAPR. Due to the high PAPR, a power amplifier designed for a communicating device capable of transmitting larger OFDM block(s) may be configured with a high IBO, which may result in an inefficient use of the power amplifier when the communicating device is not transmitting signals with high PAPR. Therefore, as an alternative or in addition to applying a high IBO to the power amplifier, PAPR reduction techniques may be used to reduce the PAPR of an input signal, such that the IBO applied to a power amplifier may be kept at a lower value to maintain the spectral and energy efficiency of the power amplifier. In addition, by reducing the PAPR, a power amplifier may amplify the signal at a higher input power (e.g., as close to the saturation point as possible and within the linear region) and produce higher output signal.

In some examples, PAPR reduction techniques may be data-dependent and/or may be computationally expensive, which may make them unfit for a real-time implementation. For example, when a PAPR reduction mechanism is designed for the front end of a real-time transmission chain (e.g., to be operated on the fly), the PAPR reduction mechanism may have a relatively short time to process the input signal. For example, every time the PAPR reduction mechanism receives an OFDM symbol, it may have less than a millisecond to process the OFDM symbol to reduce the PAPR. For most PAPR techniques, a millisecond may not be enough as a lot of processing may be involved during the PAPR reduction. Clipping and filtering (CF) is one of the PAPR reduction techniques that may be used for real-time implementations, for example, because of its low complexity and low processing time. However, CF and similar techniques may distort the signals themselves and result in in-band signal distortion, which may not converge to a desirable solution.

Cellular networks that operate in a higher and wider range of frequencies (e.g., 4G LTE, 5G NR, etc.) may have an abundance of bandwidth both in the uplink and downlink. This may include the addition of FR2 as well as the increase in the available bandwidth to 100 MHz in the sub-6 frequencies (e.g., frequencies under 6 GHz). Cellular networks with abundant or excess bandwidth may use longer OFDM symbols (e.g., larger OFDM blocks) for transmissions. While increasing the OFDM symbol size may increase the PAPR of the OFDM symbol as mentioned above, the excess bandwidth may also be used for PAPR reduction. For example, when a transmitting device is transmitting in the uplink, there may be multiple resource blocks available to the transmitting device.

In some techniques described herein, a transmitting device may use a tone reservation (TR) approach to reduce the PAPR for an OFDM symbol. These techniques may include scenarios where a transmitting device may use unused, otherwise-idle, or reserved tones (e.g., unused or reserved subcarriers) of an OFDM symbol to accommodate a peak-cancelling signal that is capable of reducing the PAPR of the OFDM symbol. For example, in a sample deployment scenario, the magnitude and the phase of reserved tones may be optimized for a given OFDM symbol to minimize the PAPR. Additionally, or alternatively, a transmitting device may reserve some tones in subcarriers of an OFDM symbol, and the reserved tones may be used for PAPR reduction instead of transmitting data.

Tones used for PAPR reduction in reservation techniques may have a variety of features. For example, a tone reserved for PAPR reduction (e.g., tone containing the peak-cancelling signal) may be referred to as a peak reduction tone (PRT). Given that, in some scenarios, there may be no overlap between one or more reserved tones and one or more data tones within one or more respective OFDM symbols (e.g., the reserved tones may be orthogonal with the data tones), a tone reservation scheme does not introduce any EVM and/or adjacent channel leakage ratio (ACLR) restrictions. Thus, a receiving device may be configured to perform rate matching around the reserved tones and decode signals in data tones. Performing rate matching around reserved tones (e.g., bypassing and not decoding signals in reserved tones) enables and provides improved device signal processing and improves communication throughput. As such, reserved tones may also be referred to herein as "non-data tones," which may include PRTs.

Varying tone characteristics may aid in some deployments. As one example, the magnitude and the phase of one or more reserved tones may be adjusted for each OFDM symbol to produce suitable PRTs. And the allocation of PRTs in each OFDM symbol may also be customized for optimized PAPR reduction. Additionally, or alternatively, a number of PRTs for each OFDM symbol may vary depending on the available bandwidth. While the location of PRTs may be determined on a per-OFDM symbol basis, fixing the location of PRTs for OFDM symbols in advance may reduce the complexity of the transmitting device. As the optimization (e.g., allocation) may be performed in advance instead of in real-time, performance of the transmitting device may be significantly improved. In addition, there may be a generally good index allocation for the PRTs within the OFDM symbol.

Figure 5:
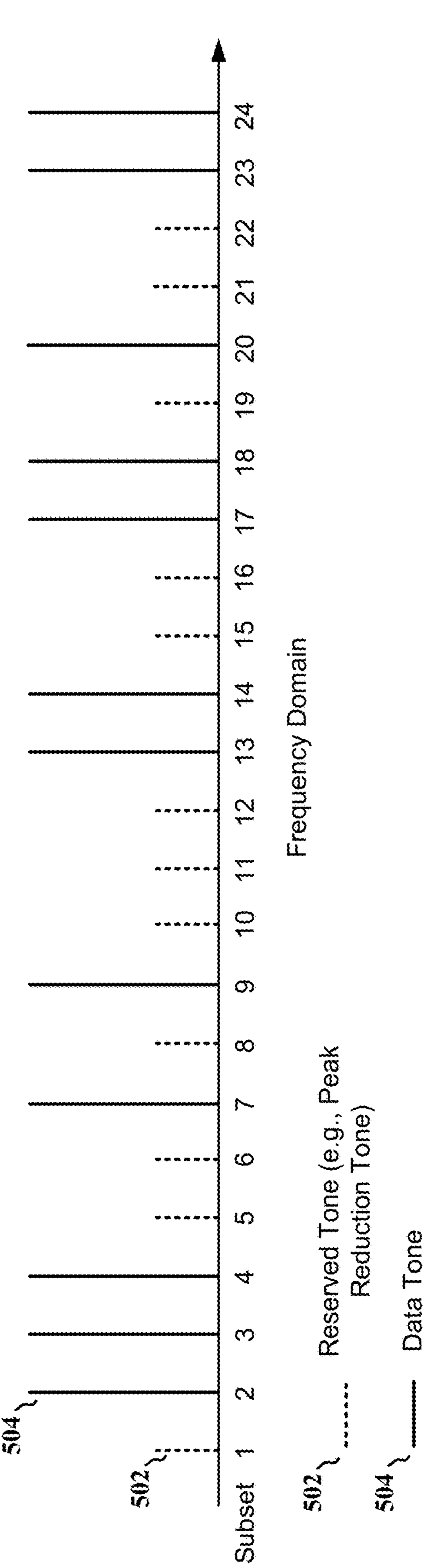
FIG. 5 is a diagram illustrating an example allocation of reserved tones and data tones, in accordance with various aspects of the present disclosure.

FIG. 5 is a diagram 500 illustrating an example allocation of reserved tones 502 (e.g., PRTs) and data tones 504 (e.g., tones containing data information), where several tones are depicted within an OFDM symbol in a frequency domain in accordance with various aspects of the present disclosure. In some examples, reserved tones 502 may be disposed among data tones 504 such that some of the data tones 504 may flank reserved tones 502. In some aspects, an allocation of the reserved tones 502 in an OFDM symbol may enable low PAPR in the time domain. For example, a transmitting device may obtain the waveform of the OFDM symbol in the time domain by taking the Inverse Fast Fourier Transform (IFFT) of the signal in the frequency domain. It may be appreciated that FIG. 5 illustrates a sample arrangement of reserved tones and data tones, and that other examples may apply many other reserved/data tone arrangements. In some aspects, reserved tones may be between 2-10% of the used tones, and may be consecutive tones. FIG. 5 illustrates examples of consecutive tones at tones 5 and 6 and tones 10, 11, and 12, for example.

In some examples, a transmitting device may customize the location and/or the number of the reserved tones 502 for an OFDM symbol. For example, if a transmitting device is granted/scheduled with two (2) resource blocks that include twenty-four (24) tones for transmission, the transmitting device may use half of the available tones (e.g., twelve (12) tones) for the reserved tones 502, and the transmitting device may optionally use the other half of the available tones for the data tones 504. In some examples, the transmitting device may select any subset of the twenty-four available tones for the reserved tones 502 if the receiving device is made aware of the selection, which may be configured through signaling and/or fixed in advance. For example, the transmitting device may choose subsets 1, 5, 6, 8, 10, 11, 12, 15, 16, 19, 21 and 22 for the reserved tones 502, and may inform its choice of the subsets to the receiving device via signaling. In some examples, the subsets may be fixed in advance so that the receiving device may know which tones are the reserved tones 502 without receiving additional signaling from the transmitting device.

Figure 6:
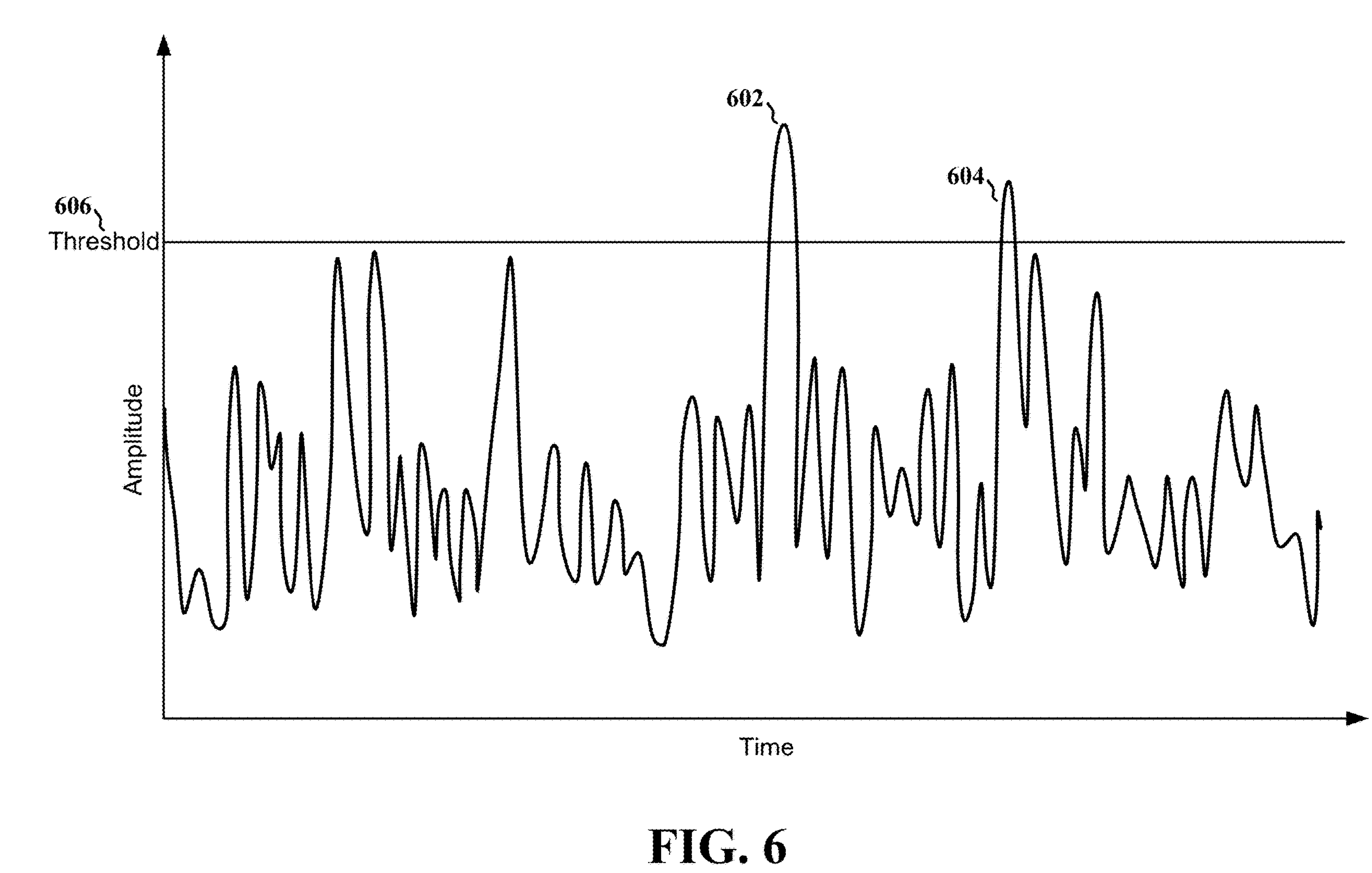
FIG. 6 is a diagram illustrating an example of a time domain data signal, in accordance with various aspects of the present disclosure.

FIG. 6 is a diagram 600 illustrating an example of a time domain data signal (e.g., an OFDM signal), as presented herein. A threshold 606 may be defined/configured for a transmitting device for determining whether a particular waveform of a time domain data signal has one or more peaks exceeding the threshold 606. The transmitting device may then determine whether to reduce any of the one or more peaks. For example, based on the threshold 606, a transmitting device may be able to determine that the waveform has a first peak 602 and a second peak 604 exceeding the threshold 606. The transmitting device may also determine the magnitude and location of the peaks, and/or the largest peak among the peaks (e.g., the first peak 602).

In mmWave (e.g., FR2) and sub-THz (e.g., FR4 and beyond) frequencies, while an increase in bandwidth (e.g., above 1 GHz) may provide a larger subcarrier spacing (SCS) (e.g., 1 MHz or above), the slot latency may also decrease linearly. In some examples, RF power consumption (e.g., power used for transmitting signals) at these frequencies may be much higher compared to RF power consumption at lower frequencies, where thousands of Watts may be consumed, for example, by each base station, or a component of a base station, for the power amplifiers. As such, PAPR reduction techniques may provide a number of benefits. For example, PAPR reduction techniques may improve the efficiency and performance of power amplifiers, thereby reducing the power used for the power amplifiers.

As described in connection with FIG. 5, a transmitting device may choose locations of the reserved tones. As a receiving device may be configured to skip decoding reserve tones, frequency resource with better channel condition (e.g., stronger tones) may be more suitable for transmitting data. Thus, in some examples, a transmitting device may be configured to allocate one or more reserved tones on channels and/or REs with weaker channel condition. For example, a reduced power—PAPR reduction scheme based on TR may be configured to use REs (e.g., tones) where the channel is weak based on channel estimation, such as REs with signal-to-noise ratio (SNR) below a threshold. That is, the transmitting device may allocate reserved tones (e.g., may apply TR) to frequency resources that have lower SNR. In other examples, other techniques may be used for projecting the signal peaks into the desired SCs based on the TR. For example, an iterative approach may be used where the peaks distortion (e.g., equal to the desired signal minus the clipped signal) may pass through FFT to zero the data tones and keep the TR tones. Then, the resulting TR tones may pass through IFFT to recalculate the peaks distortion again.

Figure 7:
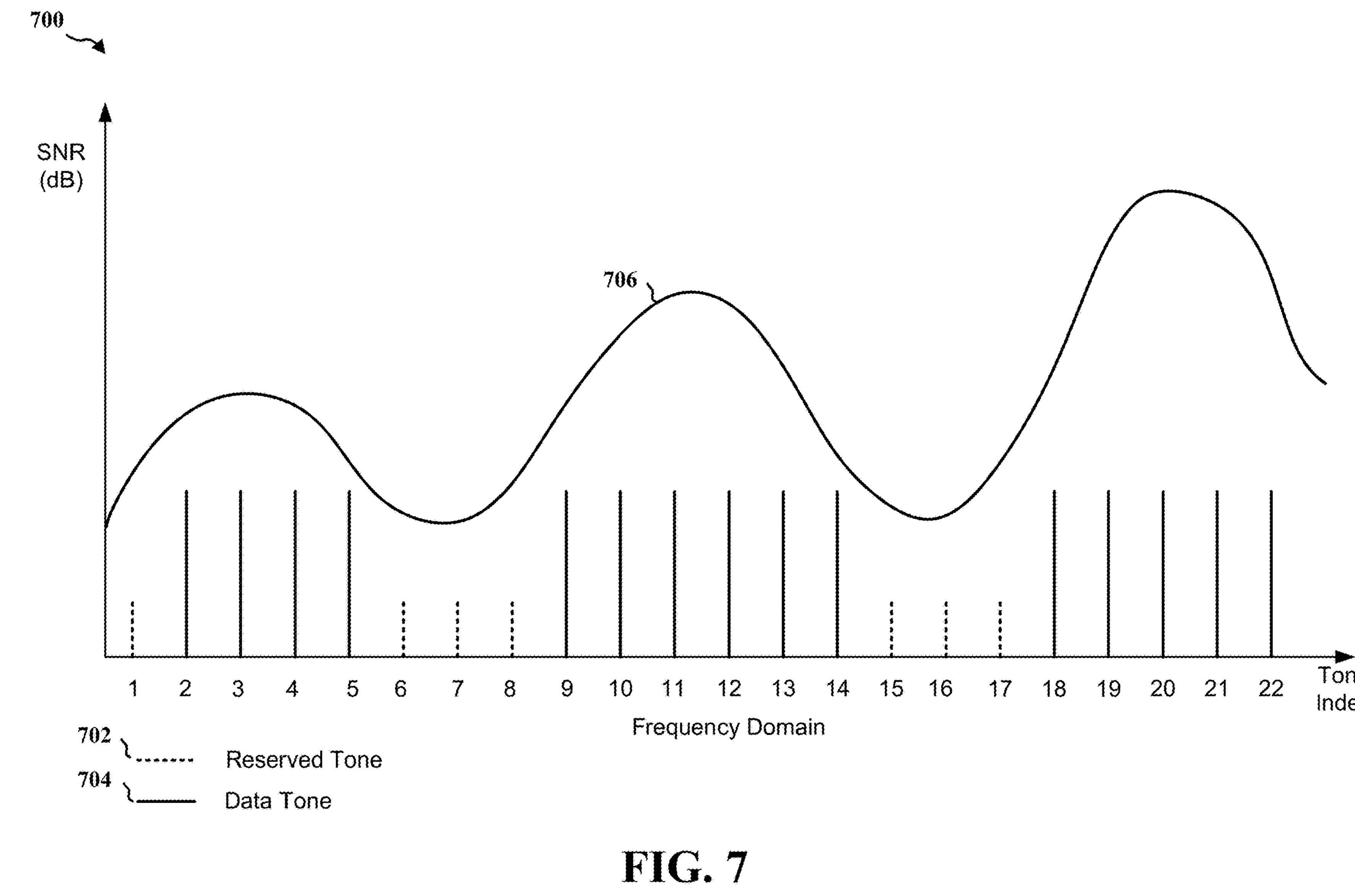
FIG. 7 is a diagram illustrating an example of a transmitting device allocating reserved tones based on signal-to-noise ratio of a channel, in accordance with various aspects of the present disclosure.

FIG. 7 is a diagram 700 illustrating an example of a transmitting device allocating reserved tones based on SNR 706 of the channel, as presented herein. In one example, a transmitting device may first estimate the channel condition of a channel by measuring the SNR 706 of the channel within a frequency resource or band, where the frequency resource or band may include a plurality of tones (e.g., SCs). The transmitting device may obtain the SNR 706 based on one or more reference signal(s) (e.g., CSI-RS, DMRS, SRS, etc.) transmitted from a receiving device. After the transmitting device estimates the channel condition (e.g., the SNR 706) for the plurality of tones, the transmitting device may allocate reserved tones to the plurality of tones based at least in part on the estimated channel condition. For example, if a transmitting device is configured to allocate reserved tones on tones having lower/lowest SNR, the transmitting device may allocate reserved tones at tone index numbers 1, 6, 7, 8, 15, 16, and 17 as these tones may have an SNR below a threshold or lower than other tones. As a receiving device may skip decoding reserved tones (e.g., by performing rate matching around the reserved tones), the SNR of the reserved tones may be less important to the receiving device compared to the SNR of the data tones. That is, the transmitting device may use tones with a lower SNR (e.g., tones with tone index numbers 1, 6, 7, 8, 15, 16, and 17) for reserved tones 702, and use tones with a higher SNR (e.g., with tone index numbers tones 2 to 5, 10 to 13, and 19 to 22) for data tones 704 (e.g., for transmitting data).

In some examples, a transmitting device may indicate TR information to a receiving device indicating the allocation/locations of the reserved tones in one or more transmissions, such that the receiving device may be aware which tones (e.g., REs) are reserved tones and/or which tones are data tones, etc. Then, the receiving device may decode the one or more transmissions based on the TR information. For example, the receiving device may be configured to decode data tones and rate match around reserved tones.

In some examples, if a receiving device has a full knowledge about the location of the reserved tones (e.g., the TR information is indicated to the transmitting device), a higher PAPR gain may be achieved at the receiving device. However, TR information may occupy a large amount of signaling overhead depending on the number of tones (e.g., data tones and reserved tones). For example, referring again to the example of FIG. 7, as there are twenty-two (22) tones in the transmission (e.g., tone index #1 to #22), the transmitting device may use a twenty-two bit field to indicate the location of the reserved tones 702 and/or the data tones 704. For example, a bit value of one ("1") may be used for indicating a data tone and a bit value of zero ("0") may be used for indicating a reserved tone, or vice versa.

For purposes of the present disclosure, the term "tone reservation" and "reserved tones" may be used interchangeably, which may refer to tones/SCs that are not used for carrying data (e.g., data tones) and/or tones/SCs that are used for PAPR reduction. In addition, for purposes of the present disclosure, a tone reservation that is known to a receiving device (e.g., the location of the reserved tones is indicated to the receiving device) may be referred to as a channel aware tone reservation.

Figure 8:
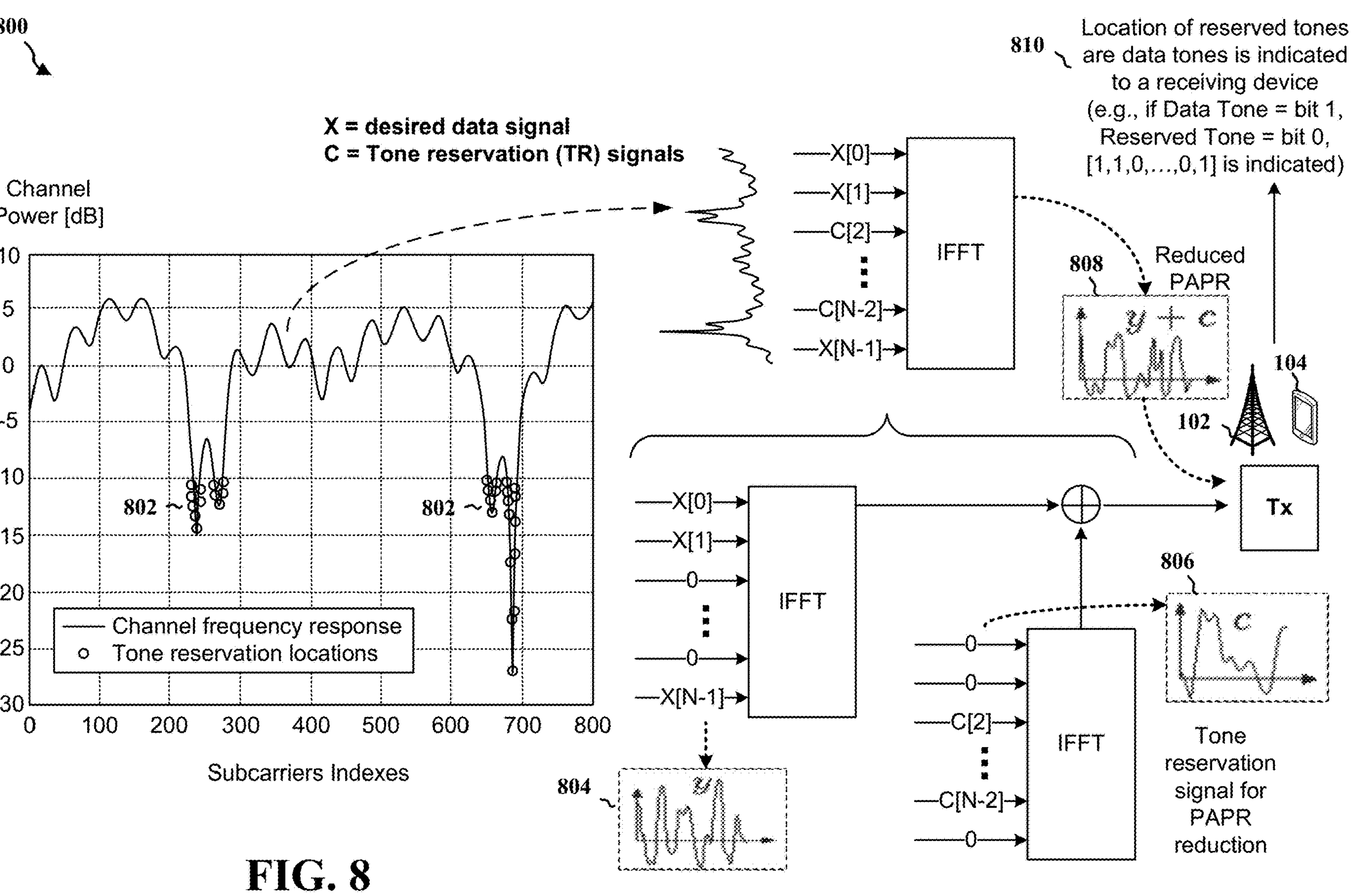
FIG. 8 is a diagram illustrating an example of a channel aware tone reservation, in accordance with various aspects of the present disclosure.

FIG. 8 is a diagram 800 illustrating an example of a channel aware tone reservation, as presented herein. In the illustrated example of FIG. 8, a transmitting device may be configured to map reserved tones based on one or more criteria. For example, the transmitting device may be configured to map the reserved tones to subcarriers (SCs) with lowest channel energy (or channel energy below a threshold), and/or to SCs with lowest channel capacity (or channel capacity below a threshold)(e.g., which may be applied for MIMO), etc. For example, a transmitting device may be configured to select tone reservation locations (e.g., allocate reserved tones) on multiple subcarriers based on measured channel power of the subcarriers. In one example, as shown at 802, the transmitting device may be configured to select tone reservation locations on subcarriers with a measured channel power below a threshold (e.g., −10 dB).

After the transmitting device determines the location of the reserved tones and/or the data tones, the transmitting device may use the data tones (e.g., represented with "X") to carry data signals, as shown at 804. Additionally, the transmitting device may use the reserved tones (e.g., represented with "C") for PAPR reduction (e.g., for generating/constructing tone reservation signal for PAPR reduction), and as shown at 806. Then, as shown at 808, the transmitting device may transmit the data signal with PAPR reduced to a receiving device.

In the illustrated example of FIG. 8, after determining the location of the reserved tones and/or data tones, the transmitting device may indicate the location of the reserved tones and/or data tones to the receiving device, as shown at 810. The receiving device may use the indicated locations to perform rate matching around the reserved tones and to decode the data tones. For example, referring again to the example of FIG. 7, if each data tones 704 in a vector (e.g., TR information to be indicated) is represented with a bit value of one ("1") and each reserved tone in the vector is represented with a second bit value of zero ("0"), then the vector may be represented with [0,1,1,1,1,0,0,0,1,1,1,1,1,1,0,0,0,1,1,1,1,1]. In some examples, as shown in FIG. 7 and at 802 of FIG. 8, because of the existing channel coherence bandwidth (e.g., similar or equivalent to a channel delay spread), a majority of the tone reservations may be in consecutive locations. Thus, the vector indicating the location of the reserved tones and/or data tones may include multiple groups of zeros and ones.

Figure 9:
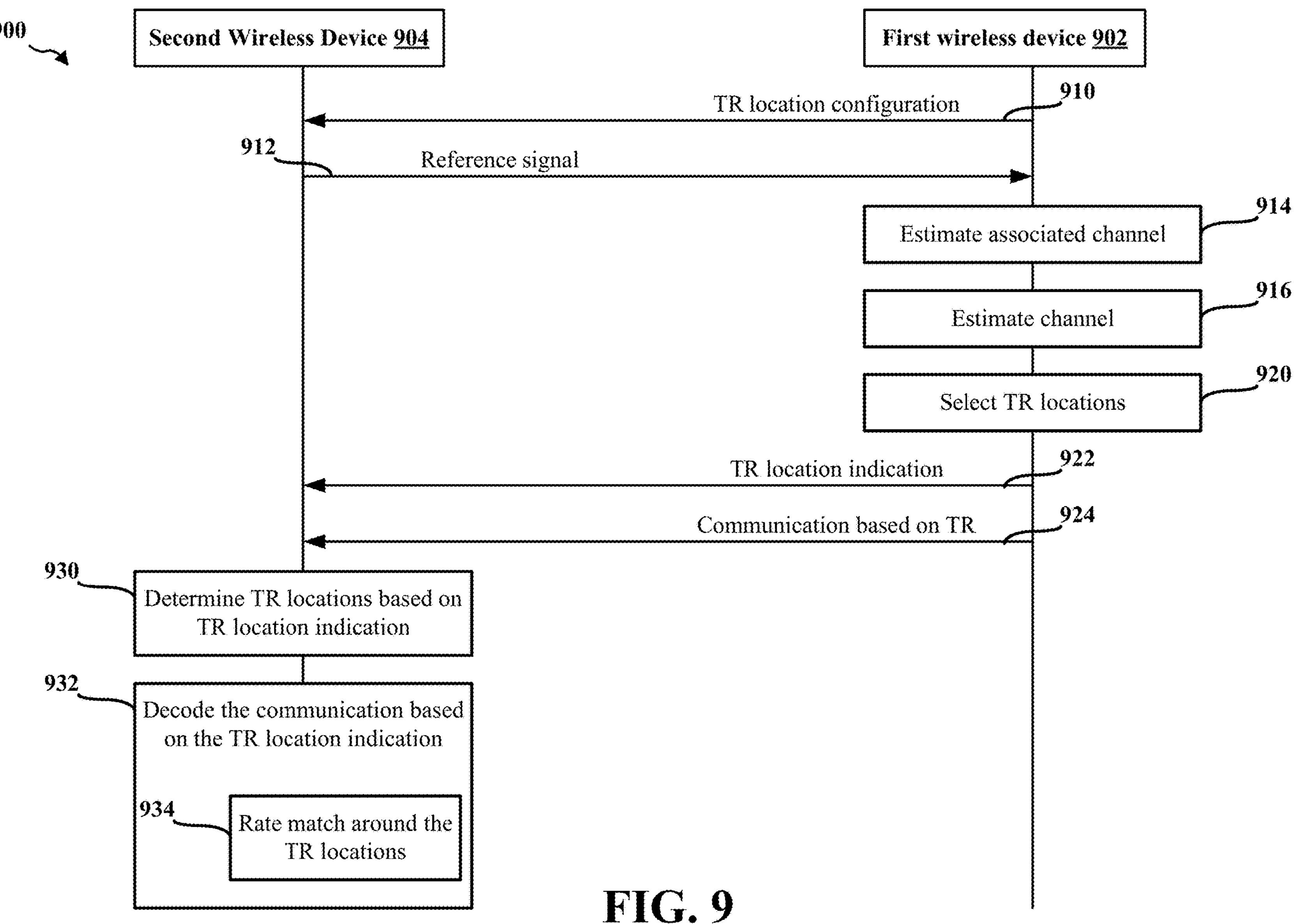
FIG. 9 illustrates an example communication flow between a network entity and a UE, in accordance with various aspects of the present disclosure.

FIG. 9 illustrates an example communication flow 900 between a first wireless device 902 (e.g., which may be referred to herein as a transmitting device) and a second wireless device 904 (e.g., which may be referred to as a receiving device). In some aspects, the first wireless device may be a network entity, and the aspects may be performed by a component of a base station or a network entity, such as a CU, a DU, and/or an RU. Aspects of the network entity may be implemented by the base station 102 of FIG. 1 and/or the base station 410 of FIG. 4. In some aspects, the second wireless device 904 may be a UE, which may correspond to the UE 104 of FIG. 1, 204 of FIG. 2, and/or the UE 450 of FIG. 4. Although not shown in the illustrated example of FIG. 9, it may be appreciated that in additional or alternative examples, the first wireless device 902 and/or the second wireless device 904 may be in communication with one or more other base stations or UEs. For example, in some aspects, the first wireless device 902 may be a network entity, the second wireless device 904 may be a UE, and the communication at 924 may be a downlink transmission. In some aspects, the first wireless device 902 may be a UE, the second wireless device 904 may be a network entity, and the communication, at 924, may be an uplink transmission. In some aspects, the first wireless device 902 may be a first UE, the second wireless device 904 may be a second UE, and the communication at 924 may be a sidelink transmission.

In the illustrated example, the communication flow 900 facilitates the first wireless device 902 providing an indication of TR locations to the second wireless device 904. The second wireless device 904 may use the indication of the TR locations to decode a communication from the first wireless device, for example, by performing rate matching around the reserved tones in a downlink communication. The communication may be downlink, uplink, or sidelink communication. In the example of FIG. 9, the tones used for TR may be subcarriers (SCs) for an entire slot, or for at least the duration of the communication, such as a PDSCH, PUSCH, or PSSCH. In some examples, the pattern of TR locations may differ for each slot, for example, to indicate another spatial direction for which new possible channel nulls may be calculated.

Although the example described in FIG. 9 illustrates the first wireless device 902 applying tone reservation for transmissions to the second wireless device 904 (e.g., for downlink (DL) transmissions), they are merely for illustrative purposes. Aspects presented herein may also be applied to a second wireless device for uplink (UL) transmissions or sidelink (SL) transmissions. In addition, the numberings (e.g., 914, 916, etc.) associated with the communication flow do not specify a particular temporal order and are used as numerical references for the communication flow.

At 912, the second wireless device 904 may transmit one or more reference signals, such as sounding reference signals (SRS) from a UE or another reference signal from a network entity, that are received by the first wireless device 902. Based on the received reference signals, the first wireless device 902 may estimate, at 914, a channel condition for a channel (e.g., a channel that is used for receiving data from the second wireless device 904) and is associated with a channel for transmitting data to the second wireless device. In one example, the first wireless device 902 may estimate, at 916, a downlink channel (e.g., a channel that is used for transmitting data to the first wireless device 902) based on channel reciprocity, where the first wireless device 902 may be configured to assume that the channel condition for the downlink channel and the uplink channel is to be similar or identical. In another example, the first wireless device 902 may estimate, at 916, an uplink channel (e.g., a channel that is used for transmitting data to the first wireless device 902) based on channel reciprocity, where the first wireless device 902 may be configured to assume that the channel condition for the uplink channel and the downlink channel is to be similar or identical. In one example, the first wireless device 902 may estimate, at 916, a first sidelink channel (e.g., a channel that is used for transmitting data to the first wireless device 902) based on channel reciprocity, where the first wireless device 902 may be configured to assume that the channel condition for the second sidelink channel and the first sidelink channel is to be similar or identical.

At 920, the first wireless device 902 may select the locations of reserved tones. In some examples, the first wireless device 902 may determine a number of tones (e.g., SCs) that are to be transmitted for one or more transmissions (e.g., communication at 924), and a number of tones that are to be designated/allocated as reserved tones. That is, the first wireless device 902 may determine a number of tones that are to be used for TR, such as described in connection with FIG. 7 and FIG. 8. The first wireless device 902 may then determine the location of the reserved tones based on the determined number of tones. In one example, as described in connection with FIG. 7 and FIG. 8, the first wireless device 902 may determine the location of the reserved tones based on the channel condition (e.g., measured energy) of the tones (e.g., associated SCs), where the first wireless device 902 may allocate the determined number of reserved tones to SCs with smallest energy or lowest SNR. For purposes of the present disclosure, the SCs with the smallest energy or the lowest SNR may also be referred to as "channel nulls."

As shown in FIG. 9, the first wireless device 902 may output a TR location indication 922 that is received by the second wireless device 904. The TR location indication 922 may indicate the location of reserved tones in a communication. In some examples, the signaling for the TR locations may be carried by downlink control information (DCI), medium access control (MAC)-control element (CE) (MAC-CE), and/or radio resource control (RRC) messages, or any combination of those signaling.

In the example of FIG. 9, the first wireless device 902 may transmit a communication 924 that is received by the second wireless device 904. The communication 924 may be based on TR (e.g., based on the TR location indication 922). The communication 924 may be downlink communication, uplink communication, or sidelink communication. For example, the first wireless device 902 may insert a TR location and values to a mapper with data. The first wireless device 902 may then continue with the regular OFDM transmission protocol (IFFT, etc.) along with the added signaling.

In some examples, if aspects disclosed herein are applied at the second wireless device 904 for uplink transmissions to the first wireless device 902 (e.g., the second wireless device 904 performs TR signaling for uplink transmissions), the first wireless device 902 may signal the second wireless device 904 to use channel null TR along with the locations of those tones (or the second wireless device 904 may report to the first wireless device 902 the chosen locations). For example, if the second wireless device 904 is to transmit an uplink transmission to the first wireless device 902 based on TR, the second wireless device 904 may use the same TR location as used by the first wireless device 902 (e.g., in a previous transmission), the first wireless device 902 may indicate to the second wireless device 904 which TR location to use (e.g., if different from the TR location used by the first wireless device 902), and/or the second wireless device 904 may determine the TR location itself (e.g., such as based on SCs with lowest SNR or smallest measured energy, etc.) and indicate the TR location to the first wireless device 902.

At 930, the second wireless device 904 may determine and/or calculate TR locations for a transmission (e.g., the communication 924) based on the TR location indication 922.

At 932, the second wireless device 904 may decode the communication 924 based on the determined TR locations (e.g., at 930). For example, the second wireless device 904 may be configured to decode data tones and to skip/ignore reserved tones. In the illustrated example of FIG. 9, the second wireless device 904 may perform, at 934, rate matching around the determined TR locations to as part of decoding the communication 924.

In some examples, the TR location indication 922 may use existing signaling so that the second wireless device 904 may skip decoding of subcarriers at locations of reserved tones without receiving specific signaling dedicated to indicating the TR locations.

For example, the TR location indication 922 may be based on a CSI-RS, such as a zero-point (ZP) CSI-RS (ZP-CSI-RS). For example, the first wireless device 902 may transmit a ZP-CSI-RS at a location corresponding to a reserved tone (e.g., as selected by the first wireless device 902 at 920). In such examples, the second wireless device 904 may determine to rate match around the location of the ZP-CSI-RS, as the ZP-CSI-RS may not include data for the second wireless device 904 to decode. However, such techniques may increase the amount of CSI-RS resources as there may a high number of selected TR locations.

In some examples, the TR location indication 922 may be implemented via a MAC scheduler at the first wireless device 902. For example, for the TR locations selected by the first wireless device 902 (e.g., at 920), the MAC scheduler of the first wireless device 902 may not allocate data tones to PRBs that correspond to the reserved tones (SCs). For example, and referring to the example of FIG. 8, the MAC scheduler may skip using PRBs corresponding to the selected tone reservation locations on subcarriers at 802. However, such techniques may place constraints on the MAC scheduler as to which PRBs may be used for communicating a transmission (e.g., the communication 924) to the second wireless device 904.

In some examples, the TR location indication 922 may be implemented using PRB-symbol bitmap rate matching patterns. Aspects of PRB-symbol bitmap rate matching patterns are described in connection with FIG. 10 and FIG. 11.

Figure 10:
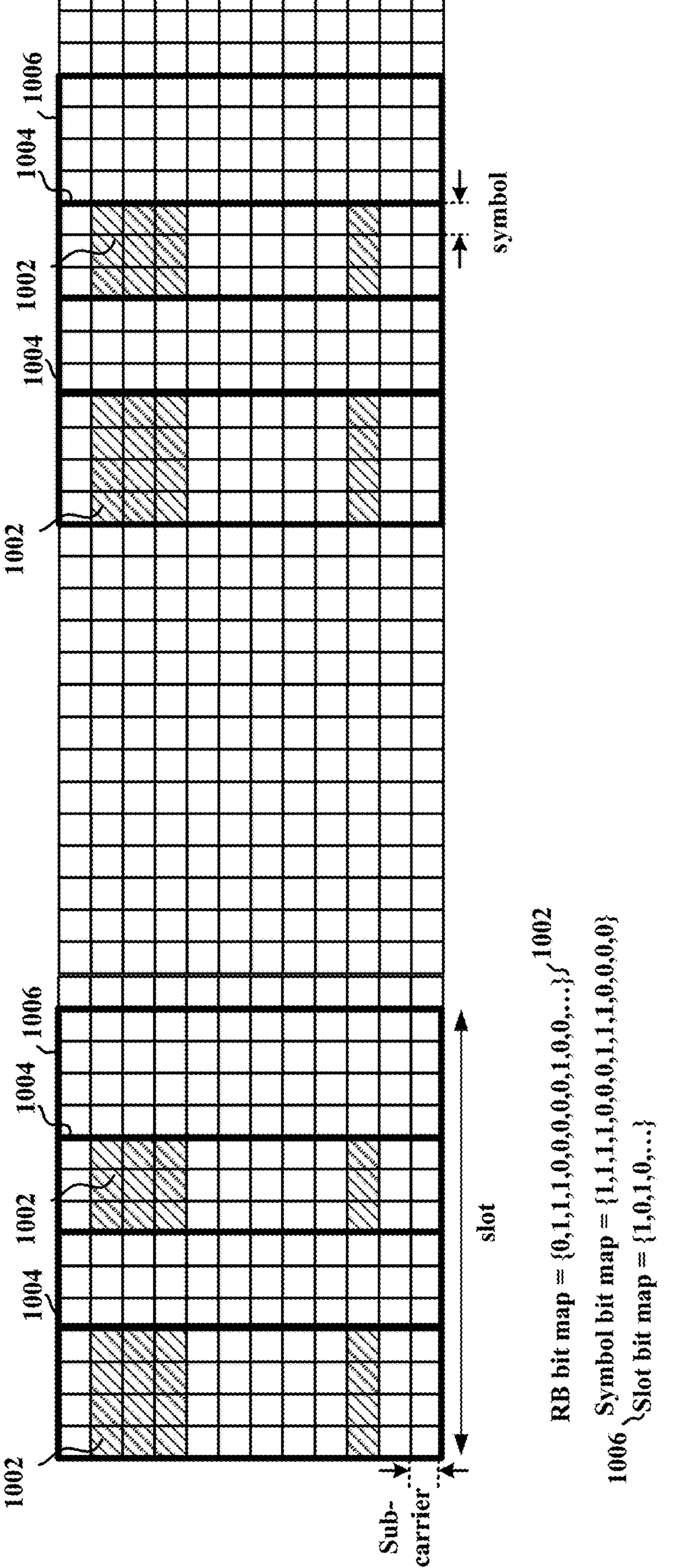
FIG. 10 is a diagram illustrating an example of physical resource block (PRB)-symbol rate matching patterns, in accordance with various aspects of the present disclosure.

FIG. 10 is a diagram 1000 illustrating an example of PRB-symbol rate matching patterns, as presented herein. FIG. 11 depicts first pseudocode 1100 and second pseudocode 1150 for facilitating an example of PRB-symbol rate matching patterns, as presented herein.

In the example of FIG. 11, the first pseudocode 1100 that shows information that may be provided to configure a plurality of PRB rate matching patterns with respective identifiers ("rateMatchPatternID"). Each PRB rate matching pattern may include a pattern type, a bitmap indicating a length in resource blocks. The pattern may indicate symbols in the resource block. For example, a PRB rate matching pattern may be based on bitmaps with a length of 275 bits ("resourceBlocks"). Additionally, a bitmap with a length of 14 bits may be used when the symbols in a resource block are for one slot ("oneSlot"), or may be of length 28 bits when the symbols in a resource block are for two slots ("twoSlots"). The pattern may include a periodicity and pattern. The pattern may be associated with a control resource set (CORESET), and/or a subcarrier spacing. The second pseudocode 1150 illustrates an additional example of a configuration for a rate matching pattern associated with a cell-specific reference signal (CRS) (e.g., a PRB rate matching pattern configured via the first pseudocode 1100).

Referring again to the example of FIG. 10, an RB bitmap 1002 may indicate the locations of RBs around which the second wireless device 904 may perform rate matching. For example, with respect to the RB bitmap 1002, a first bit value ("1") may be used for indicating an RB to perform rate matching around (e.g., an RB corresponding to a selected TR location) and a second bit zero ("0") may be used for indicating RBs to decode (e.g., an RB corresponding to data tones), or vice versa.

The example of FIG. 10 also includes a symbol bitmap 1004 that may indicate the locations of symbols around which the second wireless device 904 may perform rate matching. For example, with respect to the symbol bitmap 1004, a first bit value ("1") may be used for indicating a symbol to perform rate matching around (e.g., a symbol corresponding to a selected TR location) and a second bit zero ("0") may be used for indicating symbols to decode (e.g., a symbol corresponding to data tones), or vice versa.

The example of FIG. 10 also includes a slot bitmap 1006 that may indicate the locations of slots around which the second wireless device 904 may perform rate matching. For example, with respect to the slot bitmap 1006, a first bit value ("1") may be used for indicating a slot to perform rate matching around (e.g., a slot corresponding to a selected TR location) and a second bit zero ("0") may be used for indicating slots to decode (e.g., a slot corresponding to data tones), or vice versa.

In the illustrated examples of FIG. 10, while the respective bitmaps may enable the first wireless device 902 of FIG. 9 to indicate certain RBs, symbols, and/or slots around which to perform rate matching, the examples of FIG. 10 do not provide information at a granular level that is appropriate for selected TR locations. For example, the selected TR locations may correspond to tones (or subcarriers), which are more granular than RBs, symbols, and/or slots. Thus, there may RBs, symbols, and/or slots that are rate matched around, whereas the selected TR locations may correspond to tones within a symbol.

Referring again to the example of FIG. 9, in some examples, the TR location indication 922 may correspond to a subcarrier bitmap. For example, each bit of the subcarrier bitmap may indicate whether a respective subcarrier corresponds to a data tone or a reserved tone. Such a subcarrier bitmap may provide an appropriate level of granularity so that additional resources are not wasted by performing rate matching around a whole RB, symbol, and/or slot. However, a subcarrier bitmap may have a large message size compared to a PRB rate matching pattern. For example, and referring again to the example first pseudocode 1100 of FIG. 11, a PRB rate matching pattern may include 275 bits corresponding to the resource blocks and another 14 bits corresponding to one slot (e.g., 275+14=289 bits). In contrast, a subcarrier bitmap may have a message size that is much larger as there may be 12 tones (subcarriers) in a PRB, which may result in a bitmap of 3300 bits (e.g., 275×12=3300 bits). That is, each subcarrier bitmap bit may correspond to one subcarrier of a slot.

In examples in which the first wireless device 902 employs a subcarrier bitmap, the first wireless device 902 may output a TR location configuration 910 that configures one or more subcarrier bitmap patterns at the second wireless device 904. The first wireless device 902 may signal the TR location configuration 910 via RRC signaling that is received by the second wireless device 904. In some such examples, the TR location indication 922 may include DCI that indicates a particular subcarrier bitmap pattern of the one or more subcarrier bitmap patterns.

In some examples, to facilitate reducing the size of the subcarrier bitmaps, the level of granularity of the subcarrier bitmaps may correspond to a subcarrier group (SCG) including N subcarriers, where N is an integer greater than one. In some such examples, the size of the subcarrier bitmap may be reduced by a factor of N. For example, if an SCG includes 4 SCs, then the length of the subcarrier bitmap may be reduced by a factor of four (e.g., 275/4×12=825 bits).

In some examples, the TR location indication 922 may correspond to signaling including a subcarrier resource indicator values (subcarrier RIVs). The subcarrier RIV may be referred to as an SRIV, a TR RIV (TRIV), an RIV for TR, among other examples. For example, the TR location indication 922 may include DCI including one or more subcarrier RIVs. In some such examples, each subcarrier RIV of the one or more subcarrier RIVs may correspond to an SCG including N subcarriers, where N is an integer greater than or equal to one. For example, the TR location indication 922 may include an accumulated number of subcarrier RIVs per SCG. In some examples, a subcarrier RIV may be an encoded value (e.g., a subcarrier RIV codepoint) that may correspond to a starting subcarrier and a subcarrier length. For example, after receiving the TR location indication 922 including one or more subcarrier RIVs, the second wireless device 904 may determine, at 930, the TR locations by decoding each subcarrier RIV codepoint to determine each respective starting subcarrier and corresponding subcarrier length. That is, for a first subcarrier RIV codepoint received by the TR location indication 922, the second wireless device 904 may determine a first starting subcarrier and a corresponding subcarrier length. The subcarrier length may correspond to a number of continuous subcarriers that are included in the TR locations.

It may be appreciated that a DCI indicating the subcarrier RIVs (e.g., the TR location indication 922) may have a size that is larger, in bits, than a DCI scheduling the communication 924 at the second wireless device 904. In some aspects, the increase in the DCI size may be smaller (e.g., less added bits) if the granularity is increased from 1 subcarrier to N subcarriers, as described above. Additionally, the subcarrier RIV size for subcarrier granularity may be different for different frequency ranges. For example, for FR2, the subcarrier RIV size may range between 11 bits and 18 bits for FR2, and may range between 15 bits to 22 bits for FR1.

Figure 12:
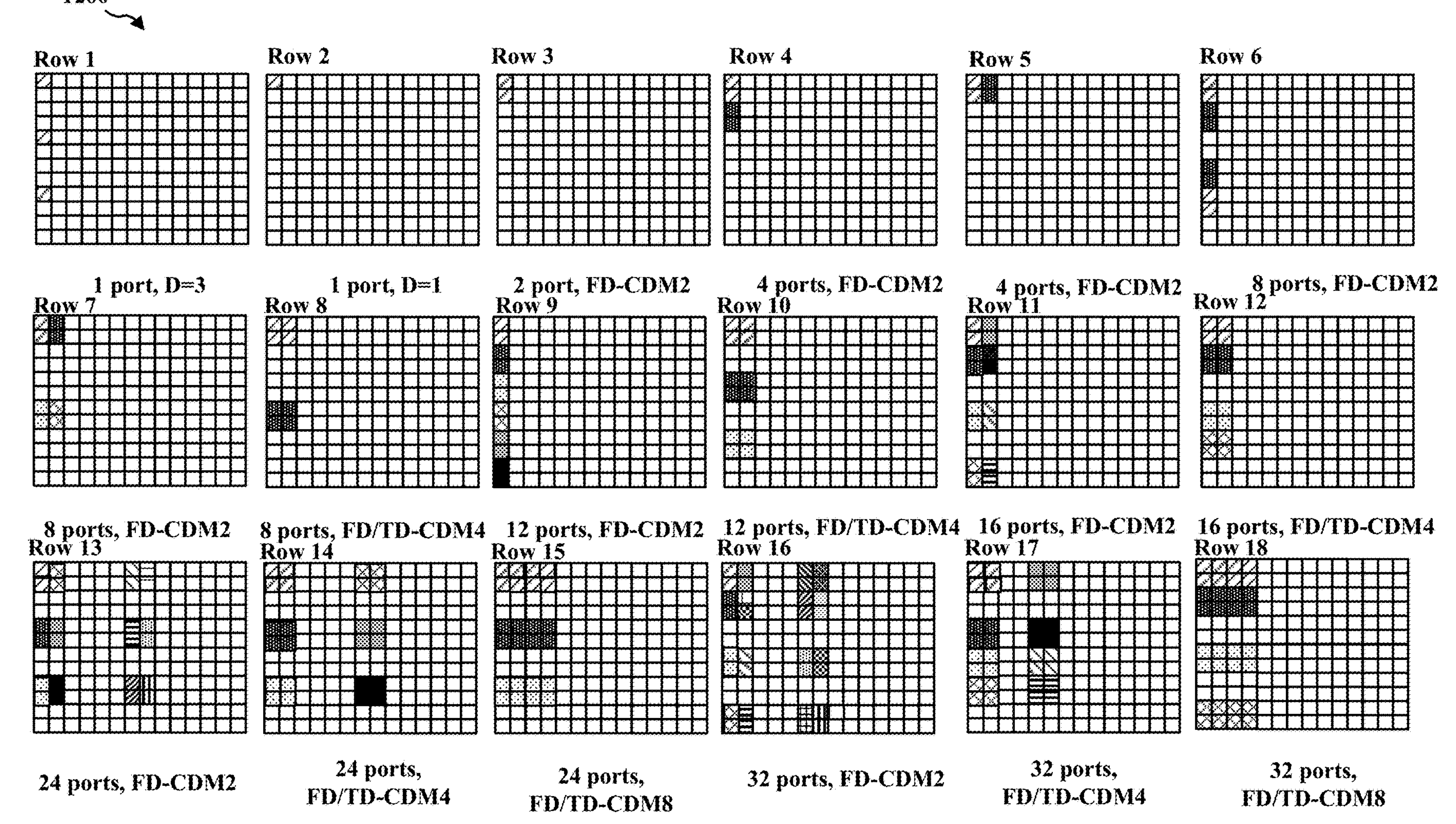
FIG. 12 is a diagram illustrating example mappings of channel state information (CSI) reference signal (CSI-RS) to physical resources, in accordance with various aspects of the present disclosure.

In some examples, the TR location indication 922 may correspond to signaling including CSI-RS for TR. In some examples, the CSI-RS for TR may correspond to a pattern of physical resources that are allocated to the respective CSI-RS for TR. For example, FIG. 12 is a diagram 1200 illustrating example mappings of CSI-RS to physical resources, as presented herein. In the example of FIG. 12, different patterns are referred to as "rows" and may include different combinations of physical resources mapping to different CSI-RS. As shown in FIG. 12, the physical resource(s) that map to a CSI-RS pattern are limited to a subset of symbols in a slot. However, the CSI-RS for TR may map so that the respective resources are allocated for an entire slot.

Referring again to the example of FIG. 9, in some examples, the TR location indication 922 may include an indication for a CSI-RS for TR and correspond to a CSI-RS pattern. For example, the first wireless device 902 may transmit a TR location configuration 910 that is received by the second wireless device 904. The TR location configuration 910 may map one or more CSI-RS s to patterns of respective physical resources, as shown in the example of FIG. 12. In some examples, the TR location configuration 910 may indicate a first set of CSI-RS s that map to first patterns of first physical resources that occupy less than all symbols of a slot for first subcarriers, as shown in FIG. 12. The TR location configuration 910 may also indicate a second set of CSI-RS s that map to second patterns of second physical resources that occupy all of the symbols of the slot for second subcarriers. It may be appreciated that the first set of CSI-RSs may correspond to CSI-RS for use in non-tone reservation scenarios, and that the second set of CSI-RS s may correspond to CSI-RS for TR. For example, in the example of FIG. 12, there are 18 different CSI-RS patterns that may correspond to the first set of CSI-RS s. The TR location configuration 910 may include additional CSI-RS patterns that may correspond to the second set of CSI-RSs (e.g., CSI-RS s for TR, which may be different from CSI-RS for non-tone reservation purposes). For example, the CSI-RS for TR may have a different allocation of subcarriers, a different number of consecutive subcarriers in a PRB, a different density (e.g., each PRB, every other PRB, or more), or different CDM groups than a CSI-RS for non-tone reservation purposes.

In some examples, the TR location configuration 910 may include a set of CSI-RS s that map to first patterns of first physical resources, such as the examples of FIG. 12. The TR location configuration 910 may also include a flag indicating whether a particular CSI-RS pattern is to be extended for the entire slot. For example, the configuration of each CSI-RS pattern may include a flag that may be set to a bit value one (1) to indicate to extend the respective mapping to the entire slot, or to a bit value zero (0) to indicate not to extend the respective mapping to the entire slot (e.g., leave the mapping as shown in FIG. 12). The CSI-RS for TR may also be activated in other ways, e.g., based on an indication for TR in a report quantity or report type configuration. In some examples, the TR location indication 922 indicate to apply or not apply (e.g., activate or deactivate) a CSI-pattern.

In some examples, the pattern of the physical resources for a CSI-RS for TR configured by the TR location configuration 910 may include a starting resource block indicator of a slot and a number of resource blocks indicator across which the CSI-RS is spanning. In some examples, the starting block indicator and the number of resource blocks indicate may each correspond to a multiple of one resource block, which may improve the granularity with which RB s are indicated for performing rate matching around by the second wireless device 904.

FIG. 13 is a flowchart 1300 of a method of wireless communication. The method may be performed by a second wireless device (e.g., the UE 104, the UE 450; the apparatus 1404). The method may be performed by the second wireless device 904. The method may be performed by a network entity, such as a base station or a component of a base station (e.g., the base station 102, the base station 410; the CU 106, the one or more CUs 210; the DU 105, the one or more DUs 230; the RU 109, the one or more RUs 240; the network entity 1602). The method provides various aspects for improved signaling of tone reservation information, such as between a network and a UE or between UEs. The use of a channel aware tone reservation may reduce PAPR while informing the receiver, e.g., such as a UE receiving downlink or sidelink transmissions or a network entity receiving uplink communication, of tones to be discarded. The use of the tone reservation may improve wireless communication performance, and the method of FIG. 13 provides signaling to inform the receiving device of the TRs in a way that helps to reduce receiver complexity.

At 1302, the second wireless device receives, from a first wireless device, a first indication of a set of TR locations associated with a communication channel, the first indication of the set of TR locations including at least one of a subcarrier bitmap, a granularity for the subcarrier bitmap, a subcarrier RIV, or a CSI-RS for TR. The communication channel may be a downlink channel, and uplink channel, or a sidelink channel. The reception may be performed, e.g., by the TR component 198, the transceiver 1422, and/or one or more antennas 1480. In some aspects, the first indication of the set of TR locations may be received via RRC signaling, e.g., included in RRC signaling, and may include one or more subcarrier bitmaps. In some aspects, the second wireless device may further receive, from the first wireless device, a second indication of an activation of the set of TR locations. As an example, the second indication may be received via DCI, e.g., included in DCI. Each subcarrier bitmap of the one or more subcarrier bitmaps may indicate a pattern of TR locations for a slot. Each subcarrier bitmap bit may correspond to one subcarrier of the slot. Each subcarrier bitmap bit may correspond to a subcarrier group (SCG) including N subcarriers, N being an integer greater than or equal to one.

In some aspects, the first indication of the set of TR locations may be received via DCI, e.g., included in DCI, and may include one or more subcarrier RIVs. The indication may be similar to an RIV (which may provide a resource allocation of contiguous PRBs) yet may provide an indication of one or more subcarriers for TR. The indication may be referred as RIV-like, a subcarrier RIV, a TR RIV, etc. Each subcarrier RIV of the one or more subcarrier RIVs may correspond to an SCG including N subcarriers, N being an integer greater than one. Each subcarrier RIV of the one or more subcarrier RIVs may correspond to an encoded value indicating a starting subcarrier and a subcarrier length. The DCI includes an accumulated number of subcarrier RIVs per SCG.

In some aspects, first indication of the set of TR locations may be received via the CSI reference signal for the TR, e.g., included in the CSI-RS for the TR, and may correspond to a pattern of physical resources allocated to the CSI reference signal for the TR. In some aspects, the second wireless device may further receive, from the first wireless device, a configuration that maps one or more CSI reference signals to patterns of respective physical resources. The configuration may indicate a first set of CSI reference signals that map to first patterns of first physical resources that occupy less than all symbols of a slot for first subcarriers, and the configuration may indicate a second set of CSI reference signals that map to second patterns of second physical resources that occupy all of the symbols of the slot for second subcarriers. In some aspects, the indication may add a flag following the first set of resources (e.g., rows 1-18), the flag indicating if the CSI-RS resources for TR stretches over an entire slot. The configuration may indicate a set of CSI reference signals mapping to first patterns of first physical resources, and the configuration may include a second indication indicating whether a respective pattern of the physical resources is extended to all symbols of a slot for a subcarrier. The pattern of the physical resources may include a starting resource block indicator of a slot and a number of resource blocks indicator across which the CSI reference signal is spanning. The starting resource block indicator and the number of resource blocks indicator may each correspond to a multiple of one resource block.

At 1304, the second wireless device receives a communication including one or more data tones and one or more reserved tones in a same symbol. The reception may be performed, e.g., by the TR component 198, the transceiver 1422, and/or one or more antennas 1480. For example, the second wireless device may receive a downlink transmission from a first wireless device, such as a base station or a component of a base station. As another example, the second wireless device may receive an uplink or sidelink transmission from a first wireless device, such as a UE.

At 1306, the second wireless device decodes the communication based on the set of TR locations. In some aspects, as a part of decoding the communication, the second wireless device may rate-match around the one or more reserved tones based on the first indication of the set of TR locations. The decoding and/or rate matching may be performed, e.g., by the TR component 198.

Figure 14:
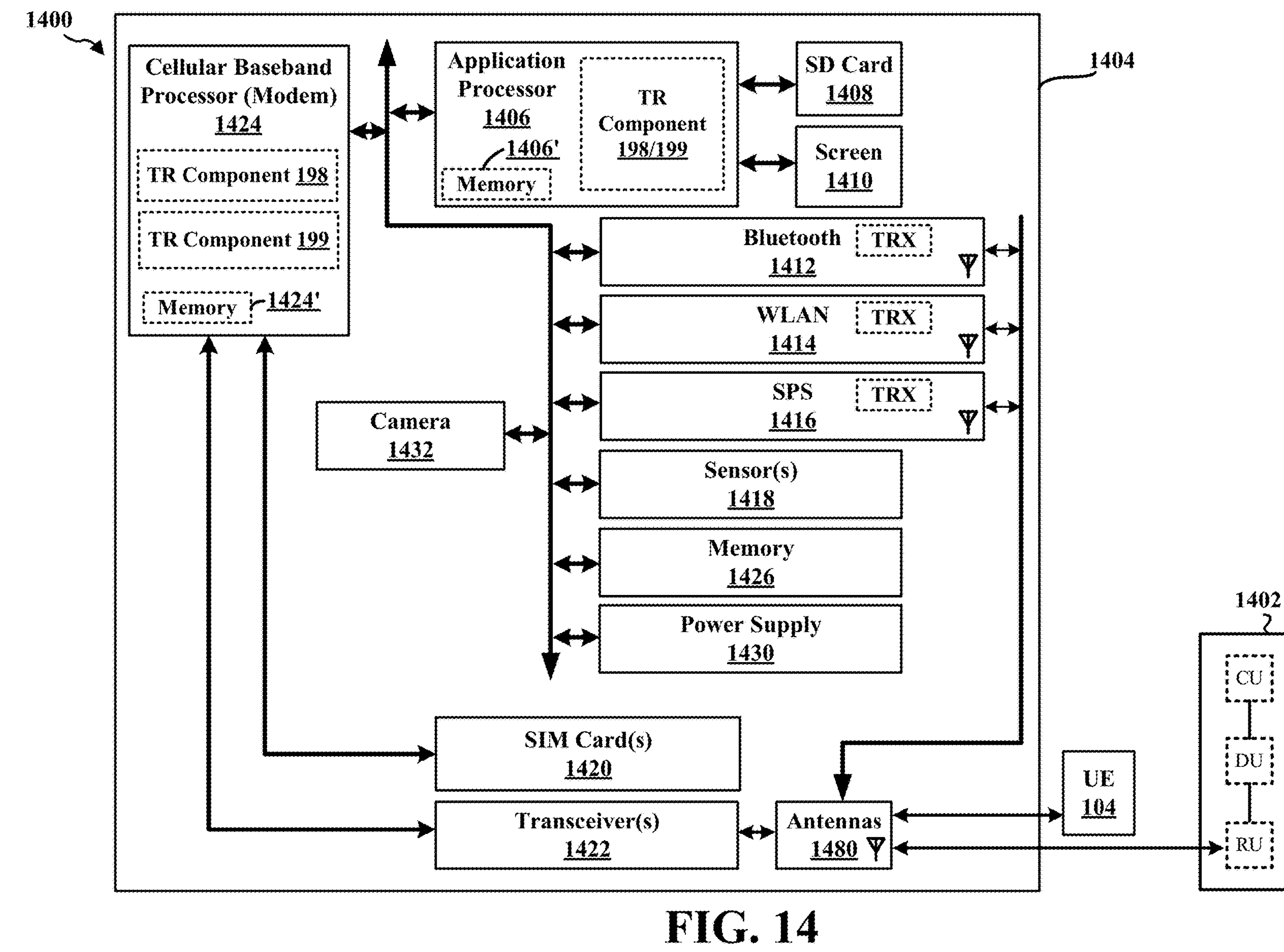
FIG. 14 is a diagram illustrating an example of a hardware implementation for an example apparatus and/or UE, in accordance with aspects presented herein.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include one or more processors (or processing circuitry), including at least one cellular baseband processor 1424 (also referred to as a modem) coupled to one or more transceivers (e.g., a cellular RF transceiver 1422). The cellular baseband processor 1424 may include at least one on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize one or more antennas 1480 for communication. The cellular baseband processor 1424 communicates through transceiver(s) (e.g., the cellular RF transceiver 1422) via one or more antennas 1480 with the UE 104 and/or with an RU associated with a network entity 1402. The cellular baseband processor 1424 and the application processor 1406 may each include a computer-readable medium/memory, such as the on-chip memory 1424', and the on-chip memory 1406', respectively. The additional memory modules 1426 may also be considered a computer-readable medium/memory. Each computer-readable medium/memory (e.g., the on-chip memory 1424', the on-chip memory 1406', and/or the additional memory modules 1426) may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory (or memory circuitry) may also be used for storing data that is manipulated by the cellular baseband processor 1424/application processor 1406 when executing software. The cellular baseband processor 1424/application processor 1406 may be a component of the UE 450 and may include the memory 460 and/or at least one of the TX processor 468, the RX processor 456, and the controller/processor 459. In one configuration, the apparatus 1404 may be at least one processor chip (modem and/or application) and include just the cellular baseband processor 1424 and/or the application processor 1406, and in another configuration, the apparatus 1404 may be the entire UE (e.g., see the UE 450 of FIG. 4) and include the additional modules of the apparatus 1404.

As discussed supra, the TR component 198 is configured to receive, from a first wireless device (e.g., a network entity or another UE), a first indication of a set of TR locations associated with a communication channel, the first indication of the set of TR locations including at least one of a subcarrier bitmap, a granularity for the subcarrier bitmap, a subcarrier RIV, or a CSI-RS for TR; receive a communication including one or more data tones and one or more reserved tones in a same symbol; and decode the communication based on the set of TR locations. In some aspects, e.g., to decode the communication, the TR component 198 may be further configured to rate-match around the one or more reserved tones based on the first indication of the set of TR locations. In some aspects, the TR component 198 may be further configured to receive, from the first wireless device, a second indication of an activation of the set of TR locations. In some aspects, the TR component 198 may be further configured to receive, from the first wireless device, a configuration that maps one or more CSI reference signals to patterns of respective physical resources. The TR component 198 may be further configured to perform any of the aspects described in connection with the flowchart in FIG. 13 and/or performed by the second wireless device 904 in the communication flow 900 of FIG. 9. The TR component 198 may be within the cellular baseband processor 1424, the application processor 1406, or both the cellular baseband processor 1424 and the application processor 1406. As discussed supra, the TR component 199 is configured to select a set of TR locations associated with a channel, the set of TR locations selected based on an estimate of an associated channel; output a first indication of the set of TR locations associated with the communication channel, the first indication of the set of TR locations including at least one of a subcarrier bitmap, a granularity for the subcarrier bitmap, a subcarrier RIV, or a CSI-RS for TR; and output, a communication including a first set of data tones and a second set of reserved tones, in a same symbol, based on the first indication of the set of TR locations. In some aspects, the TR component 199 may be further configured to output a second indication of an activation of the set of TR locations. In some aspects, the TR component 199 may be further configured to output a configuration that maps one or more CSI reference signals to patterns of respective physical resources. The TR component 199 may be further configured to perform any of the aspects described in connection with the flowchart in FIG. 15 and/or performed by the network in the communication flow 900 of FIG. 9. The TR component 199 may be within the cellular baseband processor 1424, the application processor 1406, or both the cellular baseband processor 1424 and the application processor 1406.

The TR component 198 or 199 may be one or more hardware components specifically configured to carry out the stated processes/algorithm, implemented by one or more processors (or processor circuitry) configured to perform the stated processes/algorithm, stored within a computer-readable medium (e.g., at least one memory or memory circuitry) for implementation by one or more processors, or some combination thereof. When multiple processors are implemented, the multiple processors may perform the stated processes/algorithm individually or in any combination.

As shown, the apparatus 1404 may include a variety of components configured for various functions. In one configuration, the apparatus 1404, and in particular the cellular baseband processor 1424 and/or the application processor 1406, includes means for receiving, from a network entity, a first indication of a set of TR locations associated with a downlink channel, the first indication of the set of TR locations including at least one of a subcarrier bitmap, a granularity for the subcarrier bitmap, a subcarrier RIV, or a CSI-RS for TR; means for receiving a communication including one or more data tones and one or more reserved tones in a same symbol; and means for decoding the communication based on the set of TR locations. In some aspects, e.g., to decode the communication, the apparatus 1404 may further include means for performing rate-matching around the one or more reserved tones based on the first indication of the set of TR locations. In some aspects, the apparatus 1404 may further include means for receiving, from the network entity, a second indication of an activation of the set of TR locations. In some aspects, the apparatus 1404 may further include means for receiving, from the network entity, a configuration that maps one or more CSI reference signals to patterns of respective physical resources. The apparatus 1404 may further include means for performing any of the aspects described in connection with the flowchart in FIG. 13 and/or performed by the UE in the communication flow 900 of FIG. 9.

In one configuration, the apparatus 1404 may include means for selecting a set of TR locations associated with a communication channel, the set of TR locations selected based on an estimate of an associated channel; means for outputting a first indication of the set of TR locations associated with the communication channel, the first indication of the set of TR locations including at least one of a subcarrier bitmap, a granularity for the subcarrier bitmap, a subcarrier RIV, or a CSI-RS for TR; and means for outputting a communication including a first set of data tones and a second set of reserved tones, in a same symbol, based on the first indication of the set of TR locations. In some aspects, the apparatus 1404 may further include means for outputting a second indication of an activation of the set of TR locations. The apparatus 1404 may further include means for performing any of the aspects described in connection with the flowchart in FIG. 15 and/or performed by the first wireless device 902 in the communication flow 900 of FIG. 9. The apparatus 1404 may further include means for outputting a configuration that maps one or more reference signals to patterns of respective physical resources.

The means may be the TR component 198 and/or the TR component 199 of the apparatus 1404 configured to perform the functions recited by the means. As described supra, the apparatus 1404 may include the TX processor 468, the RX processor 456, and the controller/processor 459. As such, in one configuration, the means may be the TX processor 468, the RX processor 456, and/or the controller/processor 459 configured to perform the functions recited by the means.

FIG. 15 is a flowchart 1500 of a method of wireless communication at a first wireless device. The method may be performed by a network entity, such as a base station or a component of a base station (e.g., the base station 102, the base station 410; the CU 106, the one or more CUs 210; the DU 105, the one or more DUs 230; the RU 109, the one or more RUs 240; the network entity 1602). The network entity may be referred to as a network node. The method may be performed by a UE (e.g., the UE 104, the UE 450; the apparatus 1404). The method may be performed by the first wireless device 902 in FIG. 9. The method provides various aspects for improved signaling of tone reservation information, such as between a network and a UE or between UEs. The use of a channel aware tone reservation may reduce PAPR while informing the receiver, e.g., such as a UE or a network entity, of tones to be discarded. The use of the tone reservation may improve wireless communication performance, and the method of FIG. 15 provides signaling to inform the receiver of the TRs in a way that helps to reduce receiver complexity.

At 1502, the first wireless device selects a set of TR locations associated with a communication channel, the set of TR locations selected based on an estimate of an associated channel. The selection may be performed, e.g., by the TR component 199. The TR selection may be based on channel conditions to reduce PAPR and improve communication performance. In some aspects, the communication channel may be a downlink channel, and the associated channel may be an uplink channel. In some aspects, the communication channel may be an uplink channel, and the associated channel may be a downlink channel. In some aspects, the communication channel may be a first sidelink channel, and the second channel may be a second sidelink channel.

At 1504, the first wireless device outputs, to a second wireless device, a first indication of the set of TR locations associated with the downlink channel, the first indication of the set of TR locations including at least one of a subcarrier bitmap, a granularity for the subcarrier bitmap, a subcarrier RIV, or a CSI-RS for TR. As an example, the first wireless device may transmit, to a second wireless device, a first indication of the set of TR locations associated with the communication channel, the first indication of the set of TR locations including at least one of a subcarrier bitmap, a subcarrier RIV, or a CSI-RS for TR. The output may be performed, e.g., by the TR component 199.

In some aspects, the first indication of the set of TR locations may be output via RRC signaling, e.g., included in RRC signaling, and may include one or more subcarrier bitmaps. In some aspects, the first wireless device may further output, to the second wireless device (e.g., transmit to the second wireless device), a second indication of an activation of the set of TR locations. As an example, the second indication may be output via DCI, e.g., included in DCI. Each subcarrier bitmap of the one or more subcarrier bitmaps may indicate a pattern of TR locations for a slot. Each subcarrier bitmap bit may correspond to one subcarrier of the slot. Each subcarrier bitmap bit may correspond to a subcarrier group (SCG) including N subcarriers, N being an integer greater than or equal to one.

In some aspects, the first indication of the set of TR locations may be output via DCI, e.g., included in DCI, and may include one or more subcarrier RIVs. The indication may be similar to an RIV (which may provide a resource allocation of contiguous PRBs) yet may provide an indication of one or more subcarriers for TR. The indication may be referred to as RIV-like, a subcarrier RIV, a TR RIV, etc. Each subcarrier RIV of the one or more subcarrier RIVs may correspond to an SCG including N subcarriers, N being an integer greater than one. Each subcarrier RIV of the one or more subcarrier RIVs may correspond to an encoded value indicating a starting subcarrier and a subcarrier length. The DCI includes an accumulated number of subcarrier RIVs per SCG.

In some aspects, first indication of the set of TR locations may be output via the CSI reference signal for the TR, e.g., included in the CSI-RS for the TR, and may correspond to a pattern of physical resources allocated to the CSI reference signal for the TR. In some aspects, the first wireless device may further output, to the second wireless device, a configuration that maps one or more CSI reference signals to patterns of respective physical resources. The configuration may indicate a first set of CSI reference signals that map to first patterns of first physical resources that occupy less than all symbols of a slot for first subcarriers, and the configuration may indicate a second set of CSI reference signals that map to second patterns of second physical resources that occupy all of the symbols of the slot for second subcarriers. In some aspects, the indication may add a flag following the first set of resources (e.g., rows 1-18 or fewer), the flag indicating if the CSI-RS resources for TR stretches over an entire slot. In some aspects, the set of resources may be less than rows 1-18, e.g., if a CSI-RS pattern is differentiated by a number of symbols. The configuration may indicate a set of CSI reference signals mapping to first patterns of first physical resources, and the configuration may include a second indication indicating whether a respective pattern of the physical resources is extended to all symbols of a slot for a subcarrier. The pattern of the physical resources may include a starting resource block indicator of a slot and a number of resource blocks indicator across which the CSI reference signal is spanning. The starting resource block indicator and the number of resource blocks indicator may each correspond to a multiple of one resource block.

At 1506, the first wireless device may output, to the second wireless device, a communication including a first set of data tones and a second set of reserved tones, in a same symbol, based on the first indication of the set of TR locations. For example, the network entity may transmit, to the second wireless device, a communication including a first set of data tones and a second set of reserved tones, in a same symbol, based on the first indication of the set of TR locations. The output may be performed, e.g., by the TR component.

Figure 16:
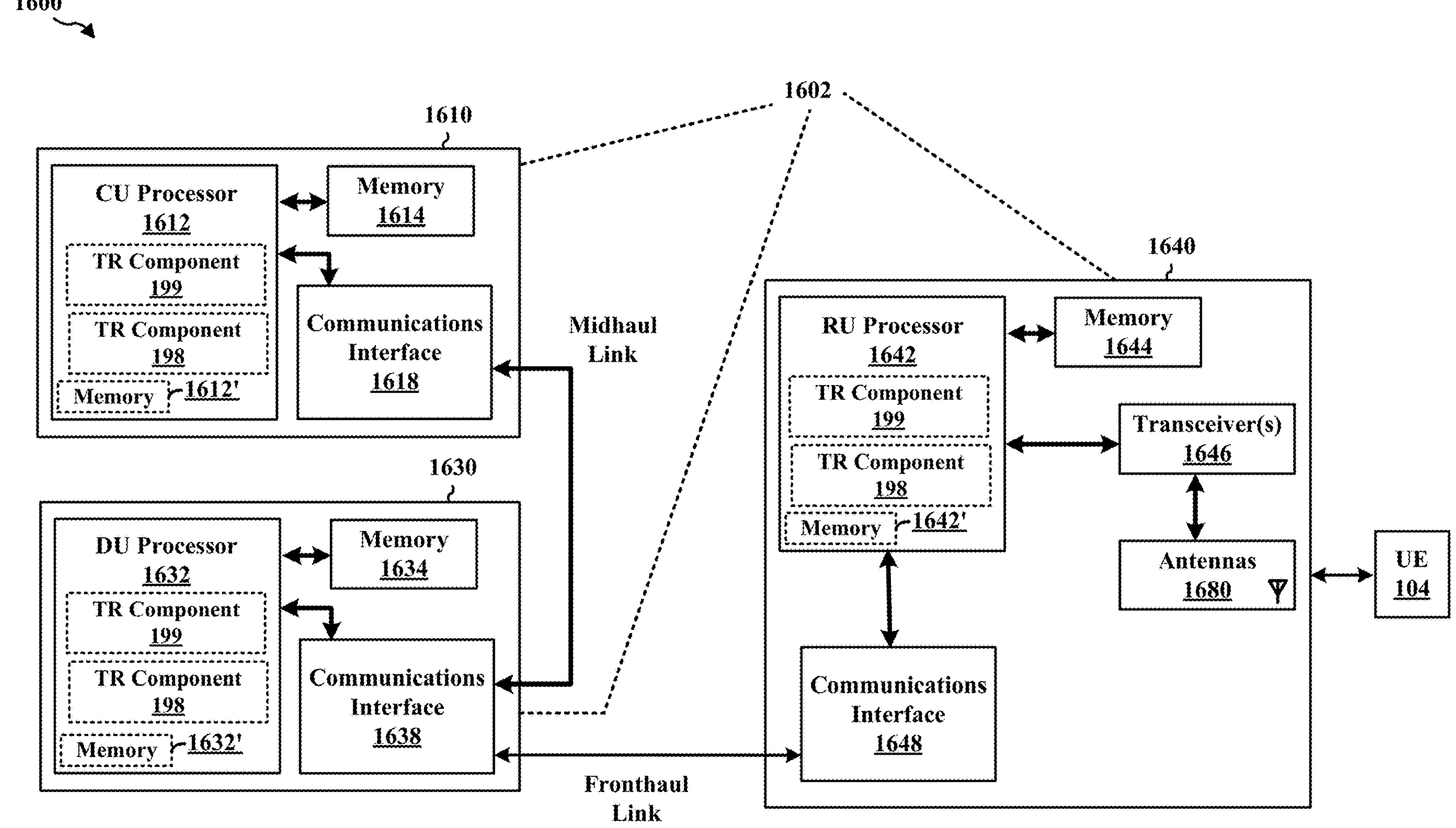
FIG. 16 is a diagram illustrating an example of a hardware implementation for an example network entity, in accordance with aspects presented herein.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the TR component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612 (or processor circuitry). The CU processor 1612 may include at least one on-chip memory 1612' (or memory circuitry). In some aspects, the CU may further include additional memory modules 1614 and a communications interface 1618. The CU 1610 communicates with the DU 1630 through a midhaul link, such as an F1 interface. The DU 1630 may include at least one DU processor 1632 (or processor circuitry). The DU processor 1632 may include at least one on-chip memory 1632' (or memory circuitry). In some aspects, the DU 1630 may further include additional memory modules 1634 and a communications interface 1638. The DU 1630 communicates with the RU 1640 through a fronthaul link. The RU 1640 may include at least one RU processor 1642 (or processor circuitry). The RU processor 1642 may include at least one on-chip memory 1642' (or memory circuitry). In some aspects, the RU 1640 may further include additional memory modules 1644, one or more transceivers 1646, antennas 1680, and a communications interface 1648. The RU 1640 communicates with the UE 104. The on-chip memories (e.g., the on-chip memory 1612', the on-chip memory 1632', and/or the on-chip memory 1642') and/or the additional memory modules (e.g., the additional memory modules 1614, the additional memory modules 1634, and/or the additional memory modules 1644) may each be considered a computer-readable medium/memory. Each computer-readable medium/memory may be non-transitory. Each of the CU processor 1612, the DU processor 1632, the RU processor 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the TR component 199 is configured to select a set of TR locations associated with a downlink channel, the set of TR locations selected based on an estimate of an uplink channel; output, to a UE, a first indication of the set of TR locations associated with the downlink channel, the first indication of the set of TR locations including at least one of a subcarrier bitmap, a granularity for the subcarrier bitmap, a subcarrier RIV, or a CSI-RS for TR; and output, to the UE, a communication including a first set of data tones and a second set of reserved tones, in a same symbol, based on the first indication of the set of TR locations. In some aspects, the TR component 199 may be further configured to output, to the UE, a second indication of an activation of the set of TR locations. In some aspects, the TR component 199 may be further configured to output, to the UE, a configuration that maps one or more CSI reference signals to patterns of respective physical resources. The TR component 199 may be further configured to perform any of the aspects described in connection with the flowchart in FIG. 15 and/or performed by the network in the communication flow 900 of FIG. 9.

As discussed supra, the TR component 198 may be configured to receive, from a UE, a first indication of a set of TR locations associated with an uplink channel, the first indication of the set of TR locations including at least one of a subcarrier bitmap, a granularity for the subcarrier bitmap, a subcarrier RIV, or a CSI-RS for TR; receive a communication including one or more data tones and one or more reserved tones in a same symbol; and decode the communication based on the set of TR locations. In some aspects, e.g., to decode the communication, the TR component 198 may be further configured to rate-match around the one or more reserved tones based on the first indication of the set of TR locations. In some aspects, the TR component 198 may be further configured to receive, from the UE, a second indication of an activation of the set of TR locations. In some aspects, the TR component 198 may be further configured to receive, from the UE, a configuration that maps one or more CSI reference signals to patterns of respective physical resources. The TR component 198 may be further configured to perform any of the aspects described in connection with the flowchart in FIG. 13 and/or performed by the second wireless device in the communication flow 900 of FIG. 9.

The TR component 199 or 198 may be within one or more processors of one or more of the CU 1610, DU 1630, and the RU 1640. The TR component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 1602 may include a variety of components configured for various functions. In one configuration, the network entity 1602 includes means for selecting a set of TR locations associated with a downlink channel, the set of TR locations selected based on an estimate of an uplink channel; means for outputting, to a UE, a first indication of the set of TR locations associated with the downlink channel, the first indication of the set of TR locations including at least one of a subcarrier bitmap, a granularity for the subcarrier bitmap, a subcarrier RIV, or a CSI-RS for TR; and means for outputting, to the UE, a communication including a first set of data tones and a second set of reserved tones, in a same symbol, based on the first indication of the set of TR locations. In some aspects, the network entity 1602 may further include means for outputting, to the UE, a second indication of an activation of the set of TR locations. The network entity 1602 may further include means for performing any of the aspects described in connection with the flowchart in FIG. 15 and/or performed by the network in the communication flow 900 of FIG. 9. The network entity 1602 may further include means for outputting, to the UE, a configuration that maps one or more CSI reference signals to patterns of respective physical resources.

The network entity 1602 may include means for receiving, from a first wireless device, a first indication of a set of TR locations associated with an uplink channel, the first indication of the set of TR locations including at least one of a subcarrier bitmap, a granularity for the subcarrier bitmap, a subcarrier RIV, or a CSI-RS for TR; means for receiving a communication including one or more data tones and one or more reserved tones in a same symbol; and means for decoding the communication based on the set of TR locations. In some aspects, e.g., to decode the communication, the network entity 1602 may further include means for performing rate-matching around the one or more reserved tones based on the first indication of the set of TR locations. In some aspects, the network entity 1602 may further include means for receiving, from the first wireless device, a second indication of an activation of the set of TR locations. In some aspects, the network entity 1602 may further include means for receiving, from the first wireless device, a configuration that maps one or more CSI reference signals to patterns of respective physical resources. The apparatus 1404 may further include means for performing any of the aspects described in connection with the flowchart in FIG. 13 and/or performed by the second wireless device in the communication flow 900 of FIG. 9.

The means may be the TR component 199 or 198 of the network entity 1602 configured to perform the functions recited by the means. As described supra, the network entity 1602 may include the TX processor 416, the RX processor 470, and the controller/processor 475. As such, in one configuration, the means may be the TX processor 416, the RX processor 470, and/or the controller/processor 475 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data or other information or instructions, such as a transmission, signal, or message, may transmit the data, instruction, or information, for example with a transceiver, or may send the data or other information to a device that transmits the data or information. A device configured to "obtain" data or other information, such as a transmission, signal, or message, may receive, for example with a transceiver, or may obtain the data from a device that receives the data or other information. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, comprising: outputting, to a second wireless device, a first indication of a set of TR locations associated with the communication channel, the set of TR locations selected based on an estimate of a corresponding channel, the first indication of the set of TR locations including at least one of a subcarrier bitmap, a granularity for the subcarrier bitmap, a subcarrier RIV, or a CSI reference signal for TR; and outputting, to the second wireless device, a communication including a first set of data tones and a second set of reserved tones, in a same symbol, based on the first indication of the set of TR locations.

In aspect 2, the method of aspect 1 further includes that the first indication of the set of TR locations is output via RRC signaling and includes one or more subcarrier bitmaps.

In aspect 3, the method of aspect 2 further includes outputting, to the second wireless device, a second indication of an activation of the set of TR locations.

In aspect 4, the method of aspect 3 further includes that the second indication is output via DCI.

In aspect 5, the method of any of aspects 2-4 further includes that each subcarrier bitmap of the one or more subcarrier bitmaps indicates a pattern of TR locations for a slot.

In aspect 6, the method of aspect 5 further includes that each subcarrier bitmap bit corresponds to one subcarrier of the slot.

In aspect 7, the method of aspect 5 further includes that each subcarrier bitmap bit corresponds to a SCG including N subcarriers, N being an integer greater than one.

In aspect 8, the method of aspect 1 further includes that the first indication of the set of TR locations is output via DCI and includes one or more subcarrier RIVs.

In aspect 9, the method of aspect 8 further includes that each subcarrier RIV of the one or more subcarrier RIVs corresponds to a SCG including N subcarriers, N being an integer greater than or equal to one.

In aspect 10, the method of aspect 8 or 9 further includes that each subcarrier RIV of the one or more subcarrier RIVs corresponds to an encoded value indicating a starting subcarrier and a subcarrier length.

In aspect 11, the method of aspect 9 further includes that the DCI includes an accumulated number of subcarrier RIVs per SCG.

In aspect 12, the method of aspect 1 further includes that the first indication of the set of TR locations is output via the CSI reference signal for the TR and corresponds to a pattern of physical resources allocated to the CSI reference signal for the TR.

In aspect 12, the method of aspect 12 further includes outputting, to the second wireless device, a configuration that maps one or more CSI reference signals to patterns of respective physical resources.

In aspect 14, the method of aspect 13 further includes that the configuration indicates a first set of CSI reference signals that map to first patterns of first physical resources that occupy less than all symbols of a slot for first subcarriers, and the configuration indicates a second set of CSI reference signals that map to second patterns of second physical resources that occupy all of the symbols of the slot for second subcarriers.

In aspect 15, the method of aspect 13 further includes that the configuration indicates a set of CSI reference signals mapping to first patterns of first physical resources, and the configuration includes a second indication indicating whether a respective pattern of the physical resources is extended to all symbols of a slot for a subcarrier.

In aspect 16, the method of any of aspects 12-15 further includes that the pattern of the physical resources includes a starting resource block indicator of a slot and a number of resource blocks indicator across which the CSI reference signal is spanning.

In aspect 17, the method of aspect 16 further includes that the starting resource block indicator and the number of resource blocks indicator each correspond to a multiple of one resource block.

In aspect 18, the method of any of aspects 1-17 further includes selecting a set of TR locations associated with a communication channel, the set of TR locations selected based on an estimate of an associated channel.

Aspect 19 is an apparatus for wireless communication at a first wireless device, comprising means for performing the method of any of aspects 1-18.

Aspect 20 is an apparatus for wireless communication at a first wireless device, comprising: memory; and at least one processor coupled to the memory and configured to perform the method of any of aspects 1-18.

Aspect 21 is an apparatus for wireless communication at a first wireless device, comprising: at least one memory; and at least one processor coupled to the at least one memory and, based at least in part on information stored in the at least one memory, the at least one processor, individually or in any combination, is configured to cause the first wireless device to perform the method of any of aspects 1-18.

Aspect 22 is an apparatus for wireless communication at a first wireless device, comprising: one or more memories; and one or more processors coupled to the one or more memories and, based at least in part on information stored in the one or more memories, the one or more processors, individually or in any combination, are operable to cause the first wireless device to perform the method of any of aspects 1-18.

Aspect 23 is an apparatus for wireless communication at a first wireless device, comprising: one or more memories; and one or more processors coupled to the one or more memories and, individually or in any combination, are operable to cause the first wireless device to perform the method of any of aspects 1-18.

Aspect 24 is an apparatus for wireless communication at a first wireless device, comprising: a processing system that includes processor circuitry and memory circuitry that stores code and is coupled with the processor circuitry, the processing system configured to cause the first wireless device to perform the method of any of aspects 1-18.

Aspect 25 is the apparatus of any of aspects 19-24 further including at least one antenna or at least one transceiver.

Aspect 26 is a computer-readable storage medium (e.g., a non-transitory computer-readable storage medium) storing computer executable code at a first wireless device, the code when executed by at least one processor causes the first wireless device to perform the method of any of aspects 1-18.

Aspect 27 is a method of wireless communication at a second wireless device, comprising: receiving, from a first wireless device, a first indication of a set of TR locations associated with a communication channel, the first indication of the set of TR locations including at least one of a subcarrier bitmap, a granularity for the subcarrier bitmap, a subcarrier RIV, or a CSI reference signal for TR; receiving a communication including one or more data tones and one or more reserved tones in a same symbol; and decoding the communication based on the set of TR locations.

In aspect 28, the method of aspect 27 further includes performing rate-matching around the one or more reserved tones based on the first indication of the set of TR locations.

In aspect 29, the method of aspect 27 or aspect 26 further includes that the first indication of the set of TR locations is received via RRC signaling and includes one or more subcarrier bitmaps.

In aspect 30, the method of aspect 29 further includes receiving, from the first wireless device, a second indication of an activation of the set of TR locations.

In aspect 31, the method of aspect 30 further includes that the second indication is received via DCI.

In aspect 32, the method of aspect 29 further includes that each subcarrier bitmap of the one or more subcarrier bitmaps indicates a pattern of TR locations for a slot.

In aspect 33, the method of aspect 32 further includes that each subcarrier bitmap bit corresponds to one subcarrier of the slot.

In aspect 34, the method of aspect 32 further includes each subcarrier bitmap bit corresponds to a SCG including N subcarriers, N being an integer greater than or equal to one.

In aspect 35, the method of aspect 27 or 28 further includes that the first indication of the set of TR locations is received via DCI and includes one or more subcarrier RIVs.

In aspect 36, the method of aspect 35 further includes that each subcarrier RIV of the one or more subcarrier RIVs corresponds to a SCG including N subcarriers, N being an integer greater than one.

In aspect 37, the method of aspect 36 further includes that each subcarrier RIV of the one or more subcarrier RIVs corresponds to an encoded value indicating a starting subcarrier and a subcarrier length.

In aspect 38, the method of aspect 36 further includes that the DCI includes an accumulated number of subcarrier RIVs per SCG.

In aspect 39, the method of aspect 27 or 28 further includes that the first indication of the set of TR locations is received via the CSI reference signal for the TR and corresponds to a pattern of physical resources allocated to the CSI reference signal for the TR.

In aspect 40, the method of aspect 39 further includes receiving, from the first wireless device, a configuration that maps one or more CSI reference signals to patterns of respective physical resources.

In aspect 41, the method of aspect 40 further includes that the configuration indicates a first set of CSI reference signals that map to first patterns of first physical resources that occupy less than all symbols of a slot for first subcarriers, and the configuration indicates a second set of CSI reference signals that map to second patterns of second physical resources that occupy all of the symbols of the slot for second subcarriers.

In aspect 42, the method of aspect 40 further includes that the configuration indicates a set of CSI reference signals mapping to first patterns of first physical resources, and the configuration includes a second indication indicating whether a respective pattern of the physical resources is extended to all symbols of a slot for a subcarrier.

In aspect 43, the method of aspect 29 further includes the pattern of the physical resources includes a starting resource block indicator of a slot and a number of resource blocks indicator across which the CSI reference signal is spanning.

In aspect 44, the method of aspect 43 further includes the starting resource block indicator and the number of resource blocks indicator each correspond to a multiple of one resource block.

Aspect 45 is an apparatus for wireless communication at a second wireless device, comprising means for performing the method of any of aspects 27-44.

Aspect 46 is an apparatus for wireless communication at a second wireless device, comprising: memory; and at least one processor coupled to the memory and configured to perform the method of any of aspects 27-44.

Aspect 47 is an apparatus for wireless communication at a second wireless device, comprising: at least one memory; and at least one processor coupled to the at least one memory and, based at least in part on information stored in the at least one memory, the at least one processor, individually or in any combination, is configured to cause the second wireless device to perform the method of any of aspects 27-44.

Aspect 48 is an apparatus for wireless communication at a second wireless device, comprising: one or more memories; and one or more processors coupled to the one or more memories and, based at least in part on information stored in the one or more memories, the one or more processors, individually or in any combination, are operable to cause the second wireless device to perform the method of any of aspects 27-44.

Aspect 49 is an apparatus for wireless communication at a second wireless device, comprising: one or more memories; and one or more processors coupled to the one or more memories and, individually or in any combination, are operable to cause the second wireless device to perform the method of any of aspects 27-44.

Aspect 50 is an apparatus for wireless communication at a second wireless device, comprising: a processing system that includes processor circuitry and memory circuitry that stores code and is coupled with the processor circuitry, the processing system configured to cause the second wireless device to perform the method of any of aspects 27-44.

Aspect 51 is the apparatus of any of aspects 45-50 further including at least one antenna or at least one transceiver.

Aspect 52 is a computer-readable storage medium (e.g., a non-transitory computer-readable storage medium) storing computer executable code at a second wireless device, the code when executed by one or more processors causes the second wireless device to perform the method of any of aspects 27-44.

What is claimed is:

1. An apparatus for wireless communication at a first wireless device, comprising:

at least one memory; and at least one processor coupled to the memory and, based at least in part on information stored in the at least one memory, the at least one processor is configured to cause the first wireless device to:

select a set of tone reservation (TR) locations based on an estimate of an associated communication channel, wherein the set of TR locations have a smallest measured energy or smallest signal to noise ratio (SNR) measured for the associated communication channel;

transmit, to a second wireless device, a first indication of the set of TR locations associated with a communication channel and selected based on the estimate of the associated communication channel wherein the first indication of the set of TR locations includes at least one of a subcarrier bitmap, a granularity for the subcarrier bitmap, a subcarrier resource indicator value (RIV), or a channel state information (CSI) reference signal for TR; and transmit a communication for the second wireless device, the communication including a first set of data tones and a second set of reserved tones, in a same symbol, based on the first indication of the set of TR locations.

2. The apparatus of claim 1, wherein the first indication of the set of TR locations is comprised in radio resource control (RRC) signaling and includes one or more subcarrier bitmaps.

3. The apparatus of claim 2, further comprising:

at least one antenna coupled to the at least one processor, wherein the at least one processor is further configured to:

output a second indication, for the second wireless device, of an activation of the set of TR locations via the at least one antenna.

4. The apparatus of claim 3, wherein the first wireless device is a network entity, and the second wireless device is a user equipment (UE), and wherein the second indication is comprised in downlink control information (DCI).

5. The apparatus of claim 2, wherein each subcarrier bitmap of the one or more subcarrier bitmaps indicates a pattern of TR locations for a slot.

6. The apparatus of claim 5, wherein each subcarrier bitmap bit corresponds to one subcarrier of the slot or each subcarrier bitmap bit corresponds to a subcarrier group (SCG) including N subcarriers, N being an integer greater than one.

7. The apparatus of claim 1, wherein the communication channel corresponds to a downlink channel, and the associated communication channel corresponds to an uplink channel, and wherein the first indication of the set of TR locations is comprised in downlink control information (DCI) and includes one or more subcarrier RIVs.

8. The apparatus of claim 7, wherein each subcarrier RIV of the one or more subcarrier RIVs corresponds to a subcarrier group (SCG) including N subcarriers, N being an integer greater than or equal to one.

9. The apparatus of claim 8, wherein each subcarrier RIV of the one or more subcarrier RIVs corresponds to an encoded value indicating a starting subcarrier and a subcarrier length.

10. The apparatus of claim 8, wherein the DCI includes an accumulated number of subcarrier RIVs per SCG.

11. The apparatus of claim 1, wherein the first indication of the set of TR locations comprised in the CSI reference signal for the TR and corresponds to a pattern of physical resources allocated to the CSI reference signal for the TR.

12. The apparatus of claim 11, wherein the at least one processor is further configured to cause the first wireless device to:

output a configuration for the second wireless device that maps one or more CSI reference signals to patterns of respective physical resources.

13. The apparatus of claim 12, wherein the configuration indicates a first set of CSI reference signals that map to first patterns of first physical resources that occupy less than all symbols of a slot for first subcarriers, and the configuration indicates a second set of CSI reference signals that map to second patterns of second physical resources that occupy all of the symbols of the slot for second subcarriers.

14. The apparatus of claim 12, wherein the configuration indicates a set of CSI reference signals mapping to first patterns of first physical resources, and the configuration includes a second indication indicating whether a respective pattern of the physical resources is extended to all symbols of a slot for a subcarrier.

15. The apparatus of claim 11, wherein the pattern of the physical resources includes a starting resource block indicator of a slot and a number of resource blocks indicator across which the CSI reference signal is spanning, wherein the starting resource block indicator and the number of resource blocks indicator each correspond to a multiple of one resource block.

16. An apparatus for wireless communication at a second wireless device, comprising:

at least one memory; and at least one processor coupled to the memory and, based at least in part on information stored in the at least one memory, the at least one processor is configured to cause the second wireless device to:

receive, from a first wireless device, a first indication of a set of tone reservations (TR) locations associated with a communication channel, wherein the set of TR locations have a smallest measured energy or smallest signal to noise ratio (SNR) measured for an associated communication channel, and wherein the first indication of the set of TR locations includes at least one of a subcarrier bitmap, a granularity for the subcarrier bitmap, a subcarrier resource indicator value (RIV), or a channel state information (CSI) reference signal for TR;

receive a communication including one or more data tones and one or more reserved tones in a same symbol; and decode the communication based on the set of TR locations.

17. The apparatus of claim 16, wherein to decode the communication, the at least one processor is further configured to cause the second wireless device:

perform rate-matching around the one or more reserved tones based on the first indication of the set of TR locations.

18. The apparatus of claim 16, wherein the first indication of the set of TR locations is comprised in radio resource control (RRC) signaling and includes one or more subcarrier bitmaps.

19. The apparatus of claim 18, further comprising:

at least one antenna coupled to the at least one processor, wherein the at least one processor is further configured to cause the second wireless device to:

receive, from the first wireless device and via the at least one antenna, a second indication of an activation of the set of TR locations, wherein the second indication is comprised in downlink control information (DCI).

20. The apparatus of claim 18, wherein each subcarrier bitmap of the one or more subcarrier bitmaps indicates a pattern of TR locations for a slot, wherein each subcarrier bitmap bit corresponds to one subcarrier of the slot.

21. The apparatus of claim 20, wherein each subcarrier bitmap bit corresponds to a subcarrier group (SCG) including N subcarriers, N being an integer greater than or equal to one.

22. The apparatus of claim 16, wherein the first wireless device is a network entity and the second wireless device is a user equipment (UE), and wherein the first indication of the set of TR locations is comprised in downlink control information (DCI) and includes one or more subcarrier RIVs.

23. The apparatus of claim 22, wherein each subcarrier RIV of the one or more subcarrier RIVs corresponds to a subcarrier group (SCG) including N subcarriers, N being an integer greater than one.

24. The apparatus of claim 23, wherein each subcarrier RIV of the one or more subcarrier RIVs corresponds to an encoded value indicating a starting subcarrier and a subcarrier length.

25. The apparatus of claim 23, wherein the DCI includes an accumulated number of subcarrier RIVs per SCG.

26. The apparatus of claim 16, wherein the first indication of the set of TR locations is comprised in the CSI reference signal for the TR and corresponds to a pattern of physical resources allocated to the CSI reference signal for the TR.

27. The apparatus of claim 26, wherein the at least one processor is further configured to cause the second wireless device to:

receive, from the first wireless device, a configuration that maps one or more CSI reference signals to patterns of respective physical resources.

28. The apparatus of claim 27, wherein the configuration indicates a first set of CSI reference signals that map to first patterns of first physical resources that occupy less than all symbols of a slot for first subcarriers, and the configuration indicates a second set of CSI reference signals that map to second patterns of second physical resources that occupy all of the symbols of the slot for second subcarriers.

29. The apparatus of claim 27, wherein the configuration indicates a set of CSI reference signals mapping to first patterns of first physical resources, and the configuration includes a second indication indicating whether a respective pattern of the physical resources is extended to all symbols of a slot for a subcarrier.

30. The apparatus of claim 26, wherein the pattern of the physical resources includes a starting resource block indicator of a slot and a number of resource blocks indicator across which the CSI reference signal is spanning, wherein the starting resource block indicator and the number of resource blocks indicator each correspond to a multiple of one resource block.

* * * * *